(12) United States Patent
Sakai et al.

(10) Patent No.: US 8,529,046 B2
(45) Date of Patent: Sep. 10, 2013

(54) INK COMPOSITION AND IMAGE FORMING METHOD

(75) Inventors: Minoru Sakai, Kanagawa (JP); Terukazu Yanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 325 days.

(21) Appl. No.: 13/023,556

(22) Filed: Feb. 9, 2011

(65) Prior Publication Data

US 2011/0193912 A1 Aug. 11, 2011

(30) Foreign Application Priority Data

Feb. 10, 2010 (JP) .................................. 2010-028079

(51) Int. Cl.
 *B41J 2/01* (2006.01)
(52) U.S. Cl.
 USPC .............................. 347/100; 347/95; 523/160
(58) Field of Classification Search
 USPC ................. 347/100, 95, 96, 101, 102, 88, 99; 106/31.27, 31.6, 31.13; 523/160, 161
 See application file for complete search history.

(56) References Cited

U.S. PATENT DOCUMENTS

| 2009/0232989 A1* | 9/2009 | Tojo | 427/256 |
| 2010/0166962 A1* | 7/2010 | Ohzeki | 427/256 |

FOREIGN PATENT DOCUMENTS

| JP | 2002-301857 A | 10/2002 |
| JP | 2006-273891 A | 10/2006 |
| JP | 2007-145970 A | 6/2007 |
| JP | 2007-277290 A | 10/2007 |
| JP | 2007277290 A * | 10/2007 |
| JP | 2009-221253 A | 10/2009 |

* cited by examiner

*Primary Examiner* — Manish S Shah
(74) *Attorney, Agent, or Firm* — SOLARIS Intellectual Property Group, PLLC

(57) ABSTRACT

An ink composition is disclosed which includes a pigment that is coated with a water-insoluble resin, particles of a water-insoluble polymer having a glass transition temperature of 100° C. or higher, a solid moistening agent, a water-soluble organic solvent, particles of a wax having a melting point of from 40° C. to lower than 100° C., and water.

12 Claims, No Drawings

INK COMPOSITION AND IMAGE FORMING METHOD

CROSS-REFERENCE TO RELATED APPLICATION

This application is based on and claims priority under 35 USC 119 from Japanese Patent Application No. 2010-028079 filed on Feb. 10, 2010, the disclosure of which is incorporated herein by reference.

BACKGROUND OF THE INVENTION

1. Field of the Invention

The present invention relates to an ink composition and an image forming method.

2. Description of the Related Art

With regard to recording media for inkjet recording and ink for use in inkjet recording, various studies on techniques for obtaining high grade recorded materials in terms of, for example, color density, fixability, resolution, curling after recording, and the like have been carried out.

Pigments have been widely used as the colorant used in inkjet recording ink, in view of favorable lightfastness, water resistance, and the like. In a case in which a pigment is dispersed for use, various studies on techniques for improving the dispersed particle diameter when dispersed, stability after dispersion, uniformity of size, performance of ejection from the inkjet head, and the like have been carried out.

In connection with the above, an ink composition containing a colorant coated with a water-insoluble polymer, resin particles, and a solid moistening agent is known as an ink composition with which the bronzing phenomenon is suppressed and which exhibits favorable fixability and favorable abrasion resistance (see, for example, Japanese Patent Application Laid-Open (JP-A) No. 2006-273891).

Further, as an ink composition which exhibits excellent image glossiness and abrasion resistance, an ink composition containing a pigment coated with a water-insoluble polymer, and two kinds of waxes having different average particle diameters has been disclosed (see, for example, JP-A No. 2007-277290).

As an inkjet recording method with which printing unevenness is suppressed and images with high image quality and water resistance are obtained, an inkjet recording method using, as an ink composition, a recording liquid that includes resin particles and wax particles has been disclosed (see, for example, JP-A No. 2002-301857).

Moreover, an ink composition containing a pigment coated with a water-insoluble resin, resin particles, and a solid moistening agent has been disclosed (see, for example, JP-A No. 2009-221253) as an ink composition which exhibits excellent dispersion stability, effective removal of the ink by wiping, and abrasion resistance.

In recent years, with respect to inkjet recording, improvements in suitability for recording are expected in order to record at a high speed in accordance with a single pass system, which enables recording with a single operation of the inkjet head, instead of using the shuttle scanning system which has been generally used hitherto, or in order to form images on both sides of a recording medium.

In conventional inkjet methods, since the printing speed is slow, solvents in the ink dry or penetrate into the recording medium during printing, thereby ensuring the strength of the spotted ink dots. Further, due to the printing speed being slow, it was never the case that a large number of recording media were printed on at one time, or that the resulting large number of recording media were stacked in a short time.

However, when forming an image at a high speed utilizing an inkjet method, the time required for drying is short and the recording media are successively stacked, owing to which the solvents in the stacked recording media are inhibited from evaporating. As a result, the recording media are stacked while the image areas remain soft and the strength of the image areas is not ensured. This has been declared to be the cause of a phenomenon (called stacker blocking) whereby images are transferred to the reverse side of recording media printed consecutively or whereby the recording media stick to each other and damage the images. These phenomena occur more frequently as the number of stacked recording media and the area of the recording media increase and, further, the phenomena occur more frequently when recording media with a lower penetration speed are used. For example, firstly, stacker blocking does not occur in the case of printing at a low speed onto a recording medium into which ink solvents penetrate quickly, as described in JP-A No. 2000-235023.

Further, in offset printing, solid particles are generally sprayed immediately after printing and, therefore, stacker blocking hardly occurs at all.

In connection with the above, a method of printing on plain paper using an inkjet ink containing a water-soluble organic solvent having a boiling point of 200° C. or lower, a pigment, a pigment dispersant, and water has been disclosed (see, for example, JP-A No. 2007-145970).

SUMMARY OF THE INVENTION

In the method of spraying solid particles immediately after printing as in the conventional technique described above, the sprayed solid particles whirl about in the air, or solid particles that have been adhered to paper whirl about during of double-sided printing, whereby the solid particles adhere to the inkjet head and, as a result, detrimental effects such as ejection failure may be produced. Therefore, the spraying of solid particles cannot be applied to printing with an inkjet system.

Further, even when the above inkjet ink containing a water-soluble organic solvent having a boiling point of 200° C. or lower is used, it is hard to prevent stacker blocking, which readily occurs in a case in which images are formed at high speed or on both sides of a recording medium. Stacker blocking is a unique problem that may occur when a large number of images is formed, or images are formed on both sides of a recording medium, by an inkjet system using a coated paper known for use in printing, such as a coated paper or art paper.

The present invention has been made in view of the above circumstances and provides an ink composition.

Further, the present invention provides an image forming method.

Note that, the term "maintenance" in the present invention includes an operation for maintaining the inkjet head that ejects the ink composition for inkjet recording and the ejection performance thereof in a desired state or close to the desired state (conservation), and an operation of washing (cleaning) the head for recording to maintain the recording head in a better state. The term "maintenance liquid" includes a washing liquid for washing off the ink composition.

According to a first aspect of the present invention, an ink composition is provided which includes a pigment that is coated with a water-insoluble resin, particles of a water-insoluble polymer having a glass transition temperature of 100° C. or higher, a solid moistening agent, a water-soluble organic solvent, particles of a wax having a melting point of from 40° C. to lower than 100° C., and water.

According to a second aspect of the present invention, an image forming method is provided which includes forming an image by ejecting the ink composition of the first aspect onto a recording medium using a single pass method.

DETAILED DESCRIPTION OF THE INVENTION

<<Ink Composition>>

The ink composition of the present invention includes a pigment that is coated with a water-insoluble resin, particles of a water-insoluble polymer having a glass transition temperature of 100° C. or higher (hereinafter, may also be referred to as "water-insoluble polymer particles having glass transition temperature of 100° C. or higher"), a solid moistening agent, a water-soluble organic solvent, particles of a wax having a melting point of from 40° C. to lower than 100° C., and water, and may further include, as necessary, other components.

By having the above configuration, an ink composition which has excellent ink stability and maintenance properties and with which an image with suppressed occurrence of blocking can be formed.

Hereinafter, each component included in the ink composition of the present invention is explained.

<Pigment Coated with Water-Insoluble Resin>

The ink composition of the present invention includes at least one pigment that is coated with a water-insoluble resin. Therefore, the ink composition of the invention has excellent dispersion stability.

The specific form of the pigment in the present invention is not particularly limited, as long as the whole or a part of the surface of the pigment particles is covered with a water-insoluble resin. For example, the form of an encapsulated pigment described below is preferable.

An encapsulated pigment is a polymer emulsion prepared such that a pigment is included into polymer particles, and more specifically, the pigment is dispersed in water through a method in which the pigment prepared is coated with a hydrophilic water-insoluble polymer resin, thereby imparting hydrophilicity to the pigment surface by a resin layer.

The resin of the encapsulated pigment is not limited, but it is preferable that the resin of the encapsulated pigment is a polymer compound having self dispersibility or solubility in a mixed solution of water and water-soluble organic solvent, and also has an anionic group (an acid group). Usually, the number average molecular weight of the resin is preferably in a range of from about 1,000 to about 100,000, and particularly preferably in a range from about 3,000 to about 50,000. Further, the resin preferably dissolves in an organic solvent to form a solution. When the number average molecular weight of the resin is within the above-described range, the resin may demonstrate a function as a coating film of the pigment or a function as a coating film of an ink composition containing the resin. The resin is preferably used in the form of an alkali metal salt or an organic amine salt.

Specific examples of the resin for forming the encapsulated pigment include materials having an anionic group, such as thermoplastic, thermo-curable, or modified acrylic-based, epoxy-based, polyurethane-based, polyether-based, polyamide-based, unsaturated polyester-based, phenol-based, silicone-containing or fluorine-containing resins; polyvinyl-based resins such as vinyl chloride, vinyl acetate, polyvinyl alcohol or polyvinyl butyral; polyester-based resins such as an alkyd resin or a phthalic acid resin; amino-based materials such as a melamine resin, a melamine-formaldehyde resin, an amino-alkyd co-condensed resin, or a urea resin; or a copolymer or a mixture thereof.

Among the above resins, the anionic acrylic-based resin may be obtained, for example, by polymerization using an acrylic monomer having an anionic group (hereinafter, referred to as an "anionic group-containing acrylic monomer") and, if necessary, other monomer(s) copolymerizable with the anionic group-containing acrylic monomer, in a solvent. Examples of the anionic group-containing acrylic monomer include acrylic monomers having one or more anionic groups selected from the group consisting of a carboxyl group, a sulfonic acid group, and a phosphonic acid group. Among them, acrylic monomers having a carboxyl group are particularly preferable.

Specific examples of the acrylic monomers having a carboxyl group include acrylic acid, methacrylic acid, crotonic acid, ethacrylic acid, propylacrylic acid, isopropylacrylic acid, itaconic acid, and fumaric acid. Among them, acrylic acid and methacrylic acid are preferable.

The encapsulated pigment may be produced using the above components by a conventional physical or chemical method. For example, the encapsulated pigment can be produced by a method described in JP-A Nos. 9-151342, 10-140065, 11-209672, 11-172180, 10-25440, and 11-43636.

Specific examples of the method include the phase inversion emulsification method and acid precipitation method described in JP-A Nos. 9-151342 and 10-140065.

Here, the phase inversion emulsification method is explained.

—Phase Inversion Emulsification Method—

Basically, the phase inversion emulsification method is a self dispersion (phase inversion emulsification) method of dispersing, in water, a mixed melt of a pigment and a resin having self dispersibility or solubility. The mixed melt may contain a curing agent or a polymer compound. Here, the mixed melt refers to a state where undissolved components are mixed, a state where dissolved components are mixed, or a state including both of these states. Details about the phase inversion emulsification method are described in JP-A No. 10-140065.

Concerning the details about the above phase inversion emulsification method and the acid precipitation method, reference can be made to the methods described in JP-A Nos. 9-151342 and 10-140065.

The "pigment coated with a water-insoluble resin" contained in the ink composition of the invention is preferably a pigment which is coated with a water-insoluble resin by the above phase inversion emulsification method from the viewpoint of dispersion stability. That is, the pigment coated with a water-insoluble resin is preferably a pigment which is dispersed using a water-insoluble resin as a dispersant in accordance with the above phase inversion emulsification method.

Next, the pigment and water-insoluble resin in the present invention are explained.

Pigment

The pigment in the present invention is not particularly limited and may be selected as appropriate according to the purposes. The types of pigment include an organic pigment and an inorganic pigment.

Examples of the organic pigment include an azo pigment, a polycyclic pigment, a dye chelate, a nitro pigment, a nitroso pigment, and aniline black. Among them, an azo pigment, a polycyclic pigment, and the like are preferable.

Examples of the azo pigment include azo lake, an insoluble azo pigment, a condensed azo pigment, and a chelate azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment.

Examples of the dye chelate include a basic dye chelate and an acidic dye chelate.

Examples of the inorganic pigments include titanium oxide, iron oxide, calcium carbonate, barium sulfate, aluminum hydroxide, barium yellow, cadmium red, chrome yellow, and carbon black. Among them, carbon black is particularly preferable. Note that, the carbon black herein may be produced by a known method such as a contact method, a furnace method, or a thermal method.

In the present invention, a single pigment may be used or plural pigments may be selected and used in combination.

Water-Insoluble Resin

In the present invention, the water-insoluble resin that is used for coating the pigment is not particularly limited, but is preferably a water-insoluble resin having a hydrophilic structural unit (a) and a hydrophobic structural unit (b).

—Hydrophilic Structural Unit (a)—

The hydrophilic structural unit (a) is not particularly limited as long as the structural unit is derived from a monomer containing a hydrophilic group. The hydrophilic structural unit (a) may be a structural unit derived from one hydrophilic group-containing monomer, or may be a structural unit derived from two or more hydrophilic group-containing monomers. The hydrophilic group is not particularly limited, and may be a dissociative group or a nonionic hydrophilic group.

The expression "... structural unit ... derived from ... (A)" used herein means a component in a polymer which component is formed by the binding of (A) to an adjacent structural unit or units.

Concerning the water-insoluble resin in the present invention, a dissociative group and/or a nonionic hydrophilic group may be introduced using a monomer including a dissociative group (dissociative group-containing monomer) and/or a monomer including a nonionic hydrophilic group.

A dissociative group is preferable from the viewpoint of stability of the emulsified state or dispersed state. Examples of the dissociative group include a carboxyl group, a phosphoric acid group, and a sulfonic acid group. Among them, a carboxyl group is preferable from the viewpoint of dispersion stability in a case in which an ink composition is prepared.

The hydrophilic group-containing monomer is preferably a dissociative group-containing monomer, and more preferably a dissociative group-containing monomer including a dissociative group and an ethylenically unsaturated bond. Examples of the dissociative group-containing monomer include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxyethyl succinic acid. Examples of the unsaturated sulfonic acid monomer include styrenesulfonic acid, 2-acrylamido-2-methylpropanesulfonic acid, 3-sulfopropyl (meth) acrylate, and bis(3-sulfopropyl)itaconate. Examples of the unsaturated phosphoric acid monomer include vinylphosphonic acid, vinyl phosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, from the viewpoints of dispersion stability and ejection stability, unsaturated carboxylic acid monomers are preferable, and acrylic acid and methacrylic acid are more preferable.

Specifically, the above hydrophilic structural unit (a) preferably includes a structural unit derived from (meth)acrylic acid.

For the hydrophilic structural unit (a), a structural unit derived from a monomer including a nonionic hydrophilic group may be used. The monomer that may be used for forming the structural unit including the nonionic hydrophilic group is not particularly limited as long as the structural unit includes a functional group that can form a polymer, such as an ethylenically unsaturated bond, and a nonionic hydrophilic functional group; and may be selected from known monomers. From the viewpoints of availability, handling property, and versatility, vinyl monomers are preferable.

Examples of the hydrophilic structural unit (a) may include vinyl monomers including a hydrophilic functional group, such as (meth)acrylates, (meth)acrylamides, and vinyl esters, each including a hydrophilic functional group.

Here, examples of the "hydrophilic functional group" include a hydroxyl group, an animo group, an amido group (in which the nitrogen atom is not substituted), and the alkylene oxides described below such as polyethylene oxide and polypropylene oxide.

Preferable specific examples of the hydrophilic structural unit (a) may include hydroxyethyl (meth)acrylate, hydroxybutyl (meth)acrylate, (meth)acrylamide, aminoethyl acrylate, aminopropyl acrylate, and (meth)acrylate including an alkylene oxide polymer.

The hydrophilic structural unit including a nonionic hydrophilic group may be formed by polymerization using the corresponding monomer, but may be also formed by introducing a hydrophilic functional group into the polymer chain after polymerization.

The hydrophilic structural unit including a nonionic hydrophilic group is more preferably a hydrophilic structural unit including an alkylene oxide structure. The alkylene moiety in the alkylene oxide structure is preferably an alkylene moiety having from 1 to 6 carbon atoms, more preferably an alkylene moiety having from 2 to 6 carbon atoms, and particularly preferably an alkylene moiety having from 2 to 4 carbon atoms, from the viewpoints of hydrophilicity. Further, the polymerization degree of the alkylene oxide structure is preferably from 1 to 120, more preferably from 1 to 60, and particularly preferably from 1 to 30.

Further, an embodiment in which the hydrophilic structural unit including a nonionic hydrophilic group is a hydrophilic structural unit including a hydroxyl group is also preferable. The number of the hydroxyl groups in the structural unit is not particularly limited, and from the viewpoints of the hydrophilicity of the water-insoluble resin and compatibility with solvent or other monomers at the time of polymerization, the number of the hydroxyl groups in the structural unit is preferably from 1 to 4, more preferably from 1 to 3, and particularly preferably 1 or 2.

In the above description, for example, the content of the hydrophilic structural unit varies depending on the proportion of the hydrophobic structural unit (b) described below. For example, when the water-insoluble resin is composed of acrylic acid and/or methacrylic acid [hydrophilic structural unit (a)] and the hydrophobic structural unit (b) described below, the content ratio of the acrylic acid and/or methacrylic acid is determined by "100-(% by mass of hydrophobic structural unit)".

The hydrophilic structural units (a) may be used alone or as a mixture of two or more of them.

The content of the hydrophilic structural unit (a) with respect to the total mass of the water-insoluble resin is preferably in a range of more than 0% by mass but 15% by mass or less, more preferably in a range of from 2% by mass to 15% by mass, even more preferably in a range of from 5% by mass to 15% by mass, and particularly preferably in a range of from 8% by mass to 12% by mass.

—Hydrophobic Structural Unit (b)—

It is preferable that the hydrophobic structural unit (b) includes a structural unit having an aromatic ring which bonds to an atom that is contained the main chain through a linking group.

In such a structural unit having an aromatic ring, the aromatic ring bonds to the atom that is contained the main chain of the water-insoluble resin through a linking group, and the aromatic ring does not directly bond to the atom that is contained in the main chain of the water-insoluble resin. Therefore, an adequate distance is kept between the hydrophobic aromatic ring and the hydrophilic structural unit and, as a result, the water-insoluble resin readily interacts with the pigment and is firmly adsorbed thereon, thereby further improving the dispersibility.

Among the "structural units having an aromatic ring which bonds to an atom that is contained in the main chain through a linking group", a structural unit represented by the following Structural formula (2) is preferable, from the viewpoint of being able to readily carry out pulverization of the pigment.

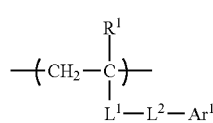

Structural Formula (2)

In Structural formula (2) above, $R^1$ represents a hydrogen atom, a methyl group, or a halogen atom.

$L^1$ represents *—COO—, *—OCO—, *—CONR$^2$—, *—O—, or a substituted or unsubstituted phenylene group, and $R^2$ represents a hydrogen atom or an alkyl group having from 1 to 10 carbon atoms. Note that, the mark "*" in the groups represented by $L^1$ denotes the bond that links to the main chain. In a case in which $L^1$ represents a substituted phenylene group, the substituent is not particularly limited, and examples of the substituent include a halogen atom, an alkyl group, an alkoxy group, a hydroxyl group, and a cyano group.

$L^2$ represents a single bond, or a divalent linking group having from 1 to 30 carbon atoms. In a case in which $L^2$ represents a divalent linking group, $L^2$ preferably represents a linking group having from 1 to 25 carbon atoms, more preferably a linking group having from 1 to 20 carbon atoms, and even more preferably a linking group having from 1 to 15 carbon atoms. Among them, $L^2$ particularly preferably represents an alkyleneoxy group having from 1 to 25 carbon atoms (more preferably, from 1 to 10 carbon atoms), an imino group (—NH—), a sulfamoyl group, a divalent linking group including an alkylene group such as an alkylene group having from 1 to 20 carbon atoms (more preferably, from 1 to 15 carbon atoms) or an ethylene oxide group [—(CH$_2$CH$_2$O)$_n$—, n=1 to 6], a group formed from a combination of two or more of them, or the like.

In Structural formula (2) above, $Ar^1$ represents a monovalent group derived from an aromatic ring.

The aromatic group that may derive the monovalent group represented by $Ar^1$ is not particularly limited, and examples thereof include a benzene ring, a condensed ring type aromatic ring having 8 or more carbon atoms, a heterocycle condensed with (an) aromatic ring(s), and a compound containing two or more benzene rings linked to each other. Details on the condensed ring type aromatic ring having 8 or more carbon atoms and the heterocycle condensed with (an) aromatic ring(s) are described below.

Among the structural units represented by Structural formula (2) above, the combination of a structural unit in which $R^1$ represents a hydrogen atom or a methyl group, $L^1$ represents *—COO—, and $L^2$ represents a divalent linking group which includes an alkyleneoxy group and/or an alkylene group and has from 1 to 25 carbon atoms is preferable, and the combination of a structural unit in which $R^1$ represents a hydrogen atom or a methyl group, $L^1$ represents *—COO—, and $L^2$ represents *—(CH$_2$—CH$_2$—O)$_n$—, wherein n represents the average number of repeating units, and n=1 to 6, is more preferable.

The "condensed ring type aromatic ring having 8 or more carbon atoms" is an aromatic compound which has 8 or more carbon atoms and includes an aromatic ring containing two or more benzene rings condensed with each other or a ring containing at least one aromatic ring and an alicyclic hydrocarbon condensed with the aromatic ring. Specific examples thereof include naphthalene, anthracene, fluorene, phenanthrene, and acenaphthene.

The "heterocycle condensed with (an) aromatic ring(s)" is a compound containing an aromatic compound that does not contain a heteroatom (preferably, a benzene ring) and a cyclic compound that contains a heteroatom, being condensed together. Herein, it is preferred that the cyclic compound that contains a heteroatom is a 5-membered ring or a 6-membered ring. The heteroatom is preferably a nitrogen atom, an oxygen atom, or a sulfur atom. The cyclic compound that contains a heteroatom may have plural heteroatoms, and in this case, the heteroatoms may be the same as or different from each other. Specific examples of the heterocycle condensed with (an') aromatic ring(s) include phthalimide, acridone, carbazole, benzoxazole, and benzothaizole.

Specific examples of the monomer that may form the structural unit represented by Structural formula (2) above include the following monomers. However, it should be construed that the present invention is not limited to these specific examples.

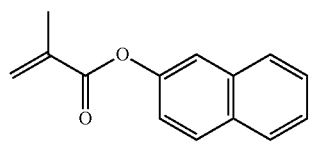

M-1

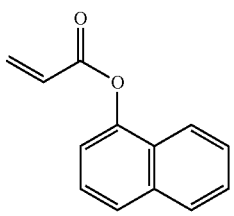

M-2

-continued
M-3
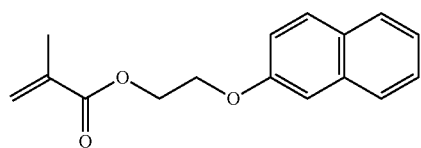
M-4
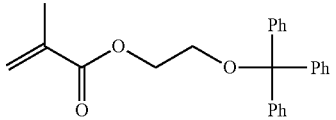
M-5
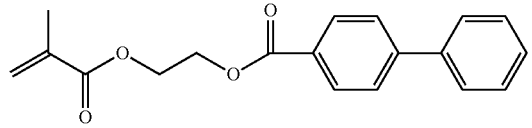
M-6
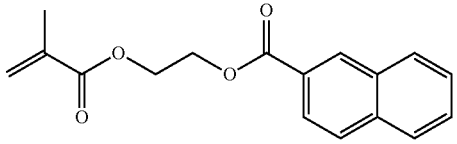
M-7
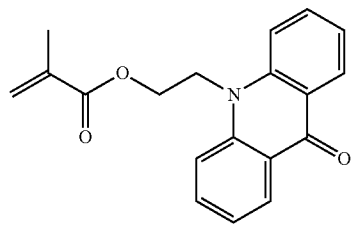
M-8
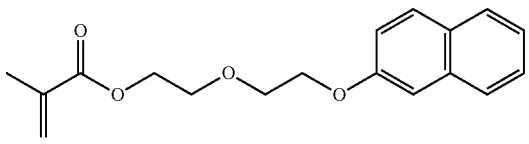
M-9
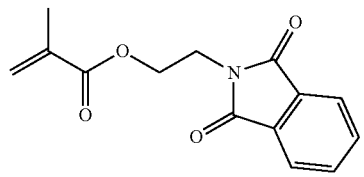
M-10
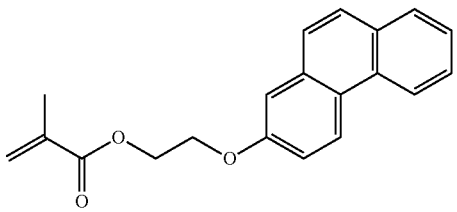
M-11
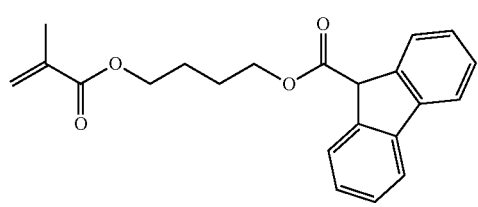
M-12
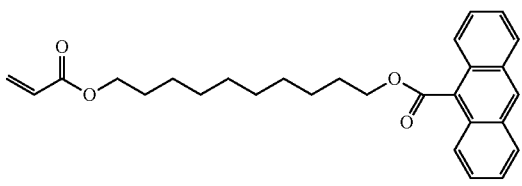
M-13
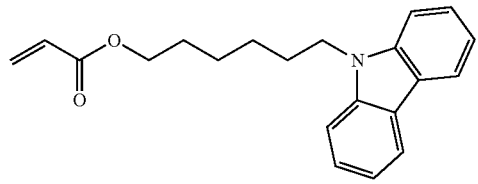
M-14
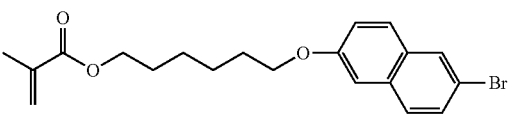
M-15
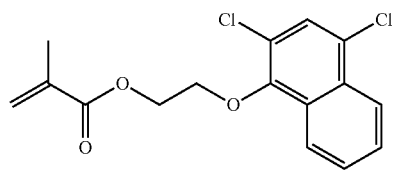
M-16
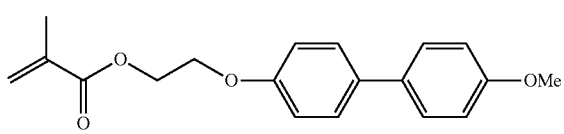
M-17
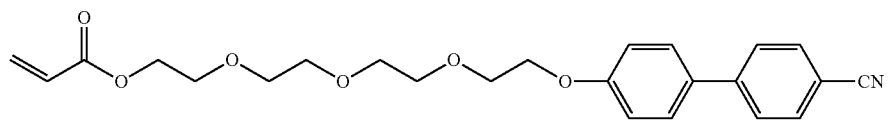

-continued

M-18

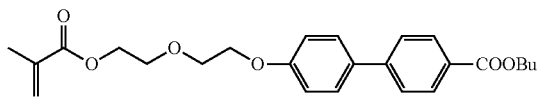

M-19

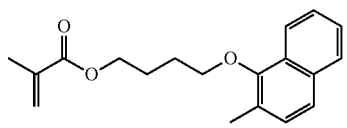

M-20

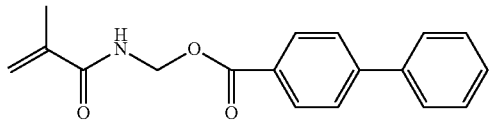

M-21

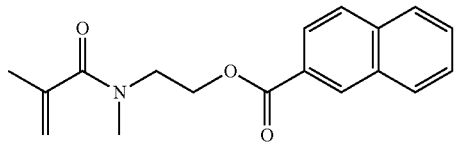

M-22

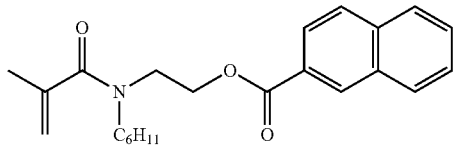

M-23

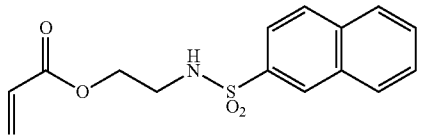

M-24

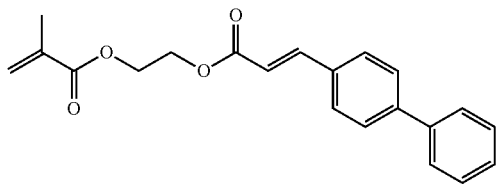

M-25

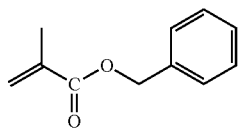

M-26

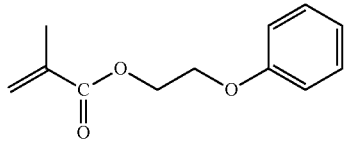

M-27

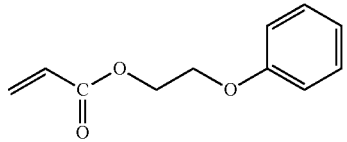

Among the structural units represented by Structural formula (2) above, a structural unit derived from a compound selected from the group consisting of benzyl methacrylate, phenoxyethyl acrylate, and phenoxyethyl methacrylate is preferable from the viewpoint of dispersion stability. In the water-insoluble resin in the present invention, it is preferable that the hydrophobic structural unit (b) includes one or two or more of the structural units selected from the above structural units.

The content of the "structural unit having an aromatic ring which bonds to an atom that is contained in the main chain through a linking group" in the water-insoluble resin is preferably 40% by mass or more with respect to the total mass of the water-insoluble resin, from the viewpoints of dispersion stability of the pigment, ejection stability, and maintenance (for example, washing) properties. The content of this structural unit is preferably 40% by mass or more but less than 75% by mass, more preferably 40% by mass or more but less than 70% by mass, and even more preferably 40% by mass or more but less than 60% by mass.

Further, the proportion of the aromatic ring which bonds to the atom that is contained in the main chain through a linking group is preferably from 15% by mass to 27% by mass, more preferably from 15% by mass to 25% by mass, and particularly preferably from 15% by mass to 20% by mass, with respect to the total mass of the water-insoluble resin, from the viewpoint of improvement in abrasion resistance.

When the proportion is adjusted to be within the above range, abrasion resistance, ink stability, and ejection reliability may be enhanced.

Furthermore, the hydrophobic structural unit (b) preferably includes a structural unit derived from an alkyl ester of (meth)acrylic acid in which the alkyl moiety has 1 to 4 carbon atoms, from the viewpoint of dispersion stability. Here, the term "(meth)acrylic acid" includes acrylic acid and methacrylic acid in its scope.

Specific examples of the alkyl ester of (meth)acrylic acid include methyl (meth)acrylate, ethyl (meth)acrylate, propyl (meth)acrylate, isopropyl (meth)acrylate, isobutyl (meth)acrylate, and t-butyl (meth)acrylate. The alkyl moiety in the alkyl ester has 1 to 4 carbon atoms, and preferably 1 or 2 carbon atoms.

The content of the "structural unit derived from an alkyl ester of (meth)acrylic acid in which the alkyl moiety has 1 to 4 carbon atoms" in the water-insoluble resin is preferably 15% by mass or more with respect to the total mass of the water-insoluble resin, in view of imparting dispersion stability. The content of this structural unit is preferably from 20% by mass to 60% by mass, and more preferably from 20% by mass to 50% by mass.

From the viewpoint of further enhancing the dispersion stability, the above hydrophobic structural unit (b) preferably includes the structural unit having an aromatic ring which bonds to an atom that is contained in the main chain through a linking group in an amount of 40% by mass or more (more preferably from 40% by mass to 75% by mass, even more preferably from 40% by mass to 70% by mass, and particularly preferably from 40% by mass to 60% by mass) with respect to the total mass of the water-insoluble resin, and the structural unit derived from an alkyl ester of (meth)acrylic acid in which the alkyl moiety has 1 to 4 carbon atoms in an amount of 15% by mass or more (more preferably from 20% by mass to 60% by mass, and particularly preferably from 20% by mass to 50% by mass) with respect to the total mass of the water-insoluble resin.

Examples of an additional hydrophobic structural unit (b) other than those described above may include structural units derived from vinyl monomers, such as (meth)acrylamides, styrenes, or vinyl esters, which do not belong to the above hydrophilic structural unit (a) (for example, those having no hydrophilic functional group), (meth)acrylates such as alkyl (having from 1 to 4 carbon atoms) esters of (meth)acrylic acid, or the like. One of these structural units may be used alone, or two or more of them may be used as a mixture.

Examples of the (meth)acrylamides include N-cyclohexyl (meth)acrylamide, N-(2-methoxyethyl) (meth)acrylamide, N,N-diallyl (meth)acrylamide, and N-allyl (meth)acrylamide.

Examples of the styrenes include styrene, methylstyrene, dimethylstyrene, trimethylstyrene, ethylstyrene, isopropylstyrene, n-butylstyrene, t-butylstyrene, methoxystyrene, butoxystyrene, acetoxystyrene, chlorostyrene, dichlorostyrene, bromostyrene, chloromethylstyrene, hydroxystyrene protected by a group (for example, t-Boc (a t-butoxycarbonyl group)) removable with an acidic substance, methyl vinylbenzoate, α-methylstyrene, and vinylnaphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

Examples of the (meth)acrylates include methyl (meth)acrylate, ethyl (meth)acrylate, propyl (meth)acrylate, isopropyl (meth)acrylate, isobutyl (meth)acrylate, and t-butyl (meth)acrylate.

The composition of the hydrophilic structural unit (a) and the hydrophobic structural unit (b) may be determined depending on the degree of hydrophilicity and hydrophobicity of each structural unit, but the composition in which the content of the hydrophobic structural unit (b) exceeds 80% by mass with respect to the total mass of the water-insoluble resin is preferable, and the composition in which the content of the hydrophobic structural unit (b) exceeds 85% by mass with respect to the total mass of the water-insoluble resin is more preferable. In other words, the content of the hydrophilic structural unit (a) with respect to the total mass of the water-insoluble resin is preferably 15% by mass or less. When the content of the hydrophilic structural unit (a) is 15% by mass or less, the amount of the component that dissolves alone in the aqueous liquid medium without making contribution to the dispersion of pigment is reduced and, as a result, a good dispersion state of the pigment can be maintained, and the increase in viscosity can be suppressed, whereby ejection performance can be made good when an ink for inkjet recording is prepared.

The water-insoluble resin in the present invention may be a random copolymer having the respective structural units introduced irregularly, or may be a block copolymer having the respective structural units introduced regularly. In a case in which the water-insoluble resin is a block copolymer, the respective structural units may be introduced in any order in synthesis, and the same constituent component may be used twice or more times. It is preferable that the water-insoluble resin is a random copolymer from the viewpoints of versatility and productivity.

The acid value of the water-insoluble resin in the present invention is preferably 100 mgKOH/g or less, from the viewpoints of pigment dispersibility, and storage stability. The acid value is more preferably from 30 mgKOH/g to 100 mgKOH/g, even more preferably from 30 mgKOH/g to 85 mgKOH/g, and particularly preferably from 50 mgKOH/g to 85 mgKOH/g.

Note that, the acid value is defined as the mass (mg) of KOH (potassium hydroxide) necessary for completely neutralizing 1 g of the water-insoluble resin, and measured by the method described in Japanese Industrial Standards (JIS) JISK 0070: 1992, the disclosure of which is incorporated by reference herein.

As to the molecular weight of the water-insoluble resin in the present invention, the weight average molecular weight (Mw) of the water-insoluble resin is preferably 30,000 or more, more preferably from 30,000 to 150,000, even more preferably from 30,000 to 100,000, and particularly preferably from 30,000 to 80,000. When the molecular weight is 30,000 or more, the water-insoluble resin may tend to provide a good steric repulsion effect as a dispersant, and may be readily adsorbed on the pigment owing to the steric effect.

Further, the number average molecular weight (Mn) of the water-insoluble resin is preferably from about 1,000 to about 100,000, and particularly preferably from about 3,000 to about 50,000. When the number average molecular weight is within the above range, the water-insoluble resin may demonstrate a function as a coating film of the pigment or a function as a coating film of the ink. The water-insoluble resin in the present invention is preferably used in the form of an alkali metal salt or an organic amine salt.

Further, the molecular weight distribution (weight average molecular weight/number average molecular weight) of the water-insoluble resin in the present invention is preferably in a range of from 1 to 6, and more preferably in a range of from 1 to 4. When the molecular weight distribution is within the above-described range, dispersion stability and ejection stability of the ink may be enhanced.

The number average molecular weight and the weight average molecular weight are each a molecular weight measured by differential refractometer detection with THF as a solvent in a GPC (gel permeation chromatography) analyzer employing columns TSKGEL GMHXL, TSKGEL G4000HXL, and TSKGEL G2000HXL (all trade names, manufactured by Tosoh Corporation). For the conversion, polystyrene is used as a standard material.

The water-insoluble resin in the present invention may be synthesized by a method selected from various polymerization methods including solution polymerization, precipitation polymerization, suspension polymerization, bulk polymerization, and emulsion polymerization. The polymerization reaction can be carried out by a known operation such as a batch, semi-continuous, or continuous operation. Examples of a method for initiating the polymerization include a method of using a radical initiator and a method of irradiating with light or radioactive rays. These polymerization methods and methods for initiating polymerization are described in, for example, "Kobunshi Gosei Hoho (Polymer Synthesis Method)" by Teiji Tsuruta, revised edition (published by Nikkan Kogyo Shimbun, Ltd., 1971) and "Kobunshi Gosei no Jikkenho (Experimental Method of Polymer Synthesis)" written by Takayuki Ohtsu and Masaetsu Kinoshita, published by Kagaku-Dojin Publishing Co., Inc. in 1972, pages 124 to 154.

Specifically, the water-insoluble resin may be produced through allowing a mixture, that includes a monomer mixture and, as needs arise, an organic solvent, and a radical polymerization initiator, to undergo a copolymerization reaction under an inert gas atmosphere. Among the polymerization methods, a solution polymerization method using a radical initiator is particularly preferable.

Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used alone or in a combination of two or more of them. Alternatively, these organic solvents may be used as a mixed solvent by mixing with water. The temperature for polymerization should be set in relation to the molecular weight of the intended polymer, the kind of the initiator, and the like, while it is usually from about 0° C. to about 100° C., and it is preferable that polymerization is carried out under a temperature of from 50° C. to 100° C. The reaction pressure may be selected as appropriate, while it is usually from 1 kg/cm² to 100 kg/cm², and is particularly preferably from about 1 kg/cm² to about 30 kg/cm². The reaction time may be from about 5 hours to about 30 hours. The obtained resin may be subjected to purification such as reprecipitation.

Specific examples of the water-insoluble resin which is preferably used in the present invention are shown below. However, it should be construed that the present invention is not limited to the following specific examples.

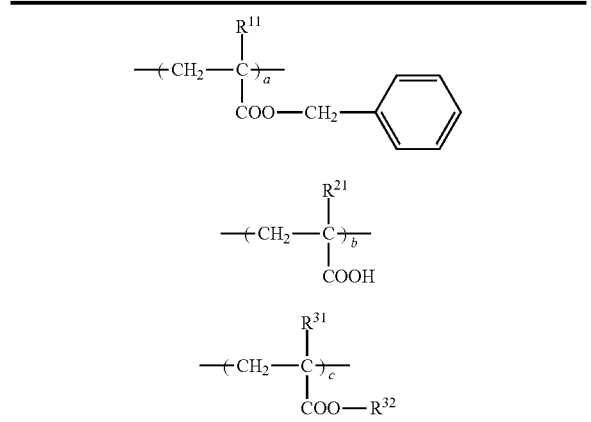

| | $R^{11}$ | $R^{21}$ | $R^{31}$ | $R^{32}$ | a | b | c | Mw |
|---|---|---|---|---|---|---|---|---|
| B-1 | $CH_3$ | $CH_3$ | $CH_3$ | $-CH_3$ | 60 | 10 | 30 | 46000 |
| B-2 | H | H | H | $-CH_3$ | 60 | 10 | 30 | 50000 |
| B-3 | $CH_3$ | $CH_3$ | $CH_3$ | $-CH_2CH_3$ | 61 | 10 | 29 | 43000 |
| B-4 | $CH_3$ | $CH_3$ | $CH_3$ | $-CH_2CH_2CH_2CH_3$ | 61 | 9 | 30 | 51000 |
| B-5 | $CH_3$ | $CH_3$ | $CH_3$ | $-CH(CH_3)_2$ | 60 | 9 | 31 | 96000 |
| B-6 | H | H | H | $-C(CH_3)_3$ | 60 | 10 | 30 | 32000 |
| B-7 | $CH_3$ | $CH_3$ | $CH_3$ | $-CH_2CH(CH_3)_2$ | 70 | 5 | 25 | 75000 |

(a, b, and c each represent the composition (% by mass) of the correspondent structural unit)

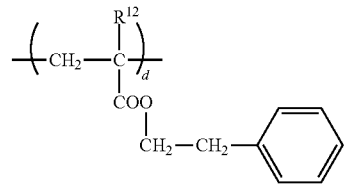

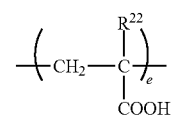

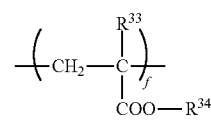

| | $R^{12}$ | $R^{22}$ | $R^{33}$ | $R^{34}$ | d | e | f | Mw |
|---|---|---|---|---|---|---|---|---|
| B-8 | $CH_3$ | $CH_3$ | $CH_3$ | $-CH_3$ | 55 | 12 | 33 | 31000 |
| B-9 | H | H | H | $-CH_2CH(CH_3)_2$ | 70 | 10 | 20 | 34600 |

(d, e, and f each represent the composition (% by mass) of the correspondent structural unit)

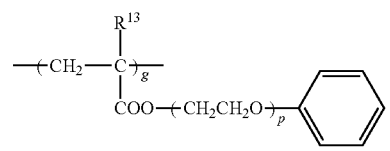

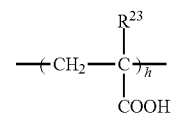

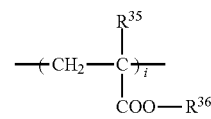

| | $R^{13}$ | p | $R^{23}$ | $R^{35}$ | $R^{36}$ | g | h | i | Mw |
|---|---|---|---|---|---|---|---|---|---|
| B-10 | $CH_3$ | 1 | $CH_3$ | $CH_3$ | $-CH_3$ | 60 | 9 | 31 | 35500 |
| B-11 | H | 1 | H | H | $-CH_2CH_3$ | 69 | 10 | 21 | 41200 |
| B-12 | $CH_3$ | 2 | $CH_3$ | $CH_3$ | $-CH_3$ | 70 | 11 | 19 | 68000 |
| B-13 | $CH_3$ | 4 | $CH_3$ | $CH_3$ | $-CH(CH_3)_2$ | 70 | 7 | 23 | 72000 |
| B-14 | H | 5 | H | H | $-CH_3$ | 70 | 10 | 20 | 86000 |
| B-15 | H | 5 | H | H | $-CH_2CH(CH_3)_2$ | 70 | 2 | 28 | 42000 |

(g, h, and i each represent the composition (% by mass) of the correspondent structural unit)

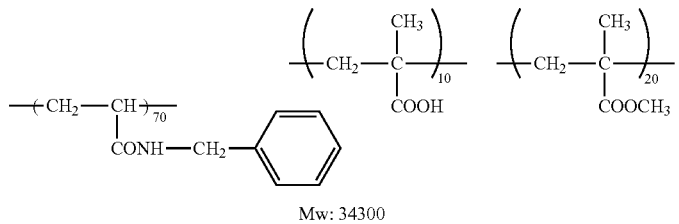

B-16

Mw: 34300

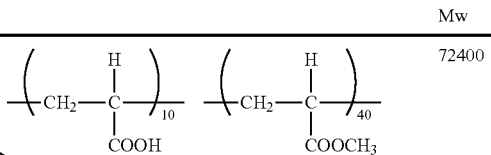

Mw

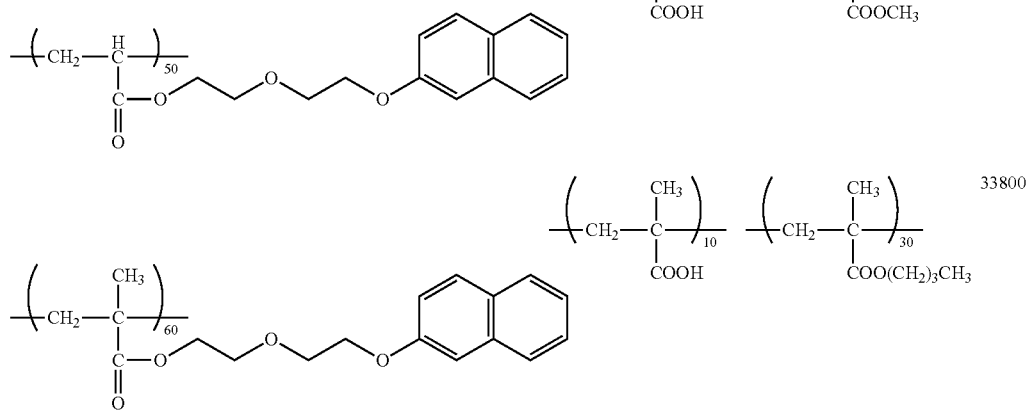

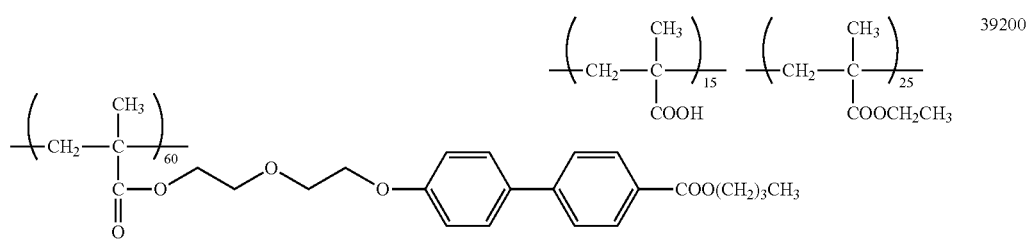

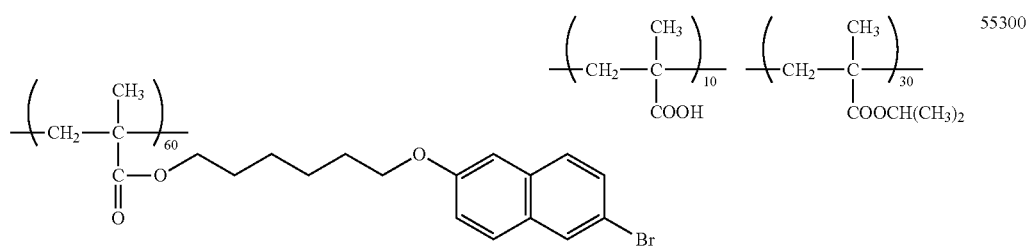

Pigment Dispersion

In the present invention, the method for producing the "pigment coated with a water-insoluble resin" is not particularly limited and, for example, the "pigment coated with a water-insoluble resin" may be produced through preparing a pigment dispersion by dispersing a pigment by the use of a water-insoluble resin as a dispersant.

By adopting such a method, the pigment particles can exist in the state of particles having fine particle diameters, and after dispersion, a high dispersion stability can be obtained. In this case, it is not always necessary that the whole surface of the pigment particle is covered with the water-insoluble resin and, according to circumstances, the pigment may be in a state in which at least a part of the surface of the pigment particle is covered with the water-insoluble resin.

Preparation of the Pigment Dispersion May be Carried Out by Using, for Example, a phase inversion emulsification method as described above. Specifically, the pigment dispersion can be prepared by the following procedure. First, the above pigment, the above water-insoluble resin as the dispersant, water, and a non-water-soluble volatile solvent are mixed, and then, the mixture is dispersed to obtain a dispersion. Thereafter, the non-water-soluble volatile solvent is removed from the obtained dispersion, to prepare the pigment dispersion. In this process, a basic compound may be added to neutralize a part or all of the anionic groups of the water-insoluble resin. By adjusting the neutralization conditions, it is possible to realize a good dispersibility. Examples of the basic compound include sodium hydroxide.

Further, in this process, the alkylene oxide adduct of glycerin described below may be added together with the non-water-soluble volatile solvent.

The above dispersion may be carried out, after mixing the desired components, by using a known method in which agitation, dispersion, or the like can be performed, or a mixing and agitating device, a dispersing device, or the like. The dispersion can be carried out by using, for example, a ball mill, a roll mill, a bead mill, a high pressure homogenizer, a high-speed agitation type disperser, an ultrasonic homogenizer, or the like.

—Pigment Dispersant—

The water-insoluble resin described above may be used as the dispersant in the preparation of the pigment dispersion. In this process, an additional pigment dispersant other than the water-insoluble resin may be used in combination.

The additional pigment dispersant may be selected as appropriate from the compounds having a function of dispersing a pigment in an aqueous phase. Examples of the pigment dispersant include nonionic compounds, anionic compounds, cationic compounds, and amphoteric compounds.

Examples of the pigment dispersant include a homopolymer of a copolymer obtained by using a monomer having an $\alpha,\beta$-ethylenically unsaturated group. Examples of the monomer having an $\alpha,\beta$-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinyl sulfonic acid, styrenesulfonic acid, sulfonated vinylnaphthalene, vinyl alcohol, acrylamide, methacryloyloxyethyl phosphate, bis(methacryloyloxyethyl) phosphate, methacryloyloxyethylphenyl acid phosphate, ethylene glycol dimethacrylate, diethylene glycol dimethacrylate, styrene, styrene derivatives such as $\alpha$-methylstyrene and vinyltoluene, vinylcyclohexane, vinylnaphthalene, vinylnaphthalene derivatives, acrylic acid alkyl ester which may be substituted by an aromatic group, acrylic acid phenyl ester, methacrylic acid alkyl ester which may be substituted by an aromatic group, methacrylic acid phenyl ester, methacrylic acid cycloalkyl ester, crotonic acid alkyl ester, itaconic acid dialkyl ester, maleic acid dialkyl ester, vinyl alcohol, and derivatives of these compounds.

The homopolymer or copolymer obtained by using the above monomer having an $\alpha,\beta$-ethylenically unsaturated group may be used as a polymer dispersant. Specific examples thereof include an acrylic acid alkyl ester-acrylic acid copolymer, a methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, polystyrene, polyester, and polyvinyl alcohol.

—Non-Water-Soluble Solatile Solvent—

When preparing the pigment dispersion, at least one non-water-soluble volatile solvent may be used. Since the non-water-soluble volatile solvent has a little influence on the dispersibility, it is possible to achieve condensation while keeping a good dispersion state by finally removing the non-water-soluble volatile solvent while keeping a good dispersibility in the dispersion process, and thus, a pigment dispersion having excellent storage stability over a long-term may be obtained. Further, in the case of preparing an ink composition by using the non-water-soluble volatile solvent and using the ink composition for recording, excellent ejection stability may be obtained and an image in which the occurrence of curling is suppressed can be formed.

The term "non-water-soluble" indicates a nature of a mixed liquid that does not show a uniform appearance even after the flow is stopped, in the case of being slowly mixed with an equivalent volume of pure water under the conditions of 1 atmospheric pressure and a temperature of 20° C. The solubility in water at 20° C. is preferably 80 g/100 mL or less, and is more preferably 50 g/100 mL or less.

The term "volatile" indicates that the boiling point is 200° C. or lower. It is preferable that the boiling point is 150° C. or lower.

The non-water-soluble volatile solvent may desirably be selected from among organic solvents having non-water solubility and volatility. Specific examples of the non-water-soluble volatile solvent include ketone solvents (for example, methyl ethyl ketone, diethyl ketone, and the like) and ether solvents (for example, dibutyl ether and the like). Among them, from the viewpoint of imparting dispersion stability, ketone solvents are preferable, and among the ketone solvents, methyl ethyl ketone is most preferable.

The addition amount of the non-water-soluble volatile solvent is preferably from 10% by mass to 1,000% by mass, more preferably from 50% by mass to 800% by mass, and particularly preferably from 100% by mass to 500% by mass, with respect to the addition amount of the alkylene oxide adduct of glycerin, in view of achieving good dispersibility and good stability after dispersion, as well as ejection stability and suppression of curling in the case of preparing an ink composition by using the non-water-soluble volatile solvent and using the ink composition for recording.

The non-water-soluble volatile solvent explained above is preferably removed from the liquid after the dispersion of the pigment. When the non-water-soluble volatile solvent is removed after dispersion, the amount of the non-water-soluble volatile solvent that is not needed finally may be reduced, while keeping the pigment dispersibility and storage stability over a long-term, and thus, a condensed pigment dispersion may be obtained. Further, in a case in which the non-water-soluble volatile solvent is used for preparing a pigment ink and the resulting pigment ink is used for image recording, ejection stability may be provided and occurrence of curling after recording may be suppressed.

The non-water-soluble volatile solvent may be removed by an ordinary method such as drying treatment such as heating or air blowing, or distillation under a reduced pressure. When the non-water-soluble volatile solvent is distilled off from the dispersion obtained in the dispersion process, the dispersion is condensed and exhibits phase inversion to the aqueous phase. In this case, when a water-insoluble resin is used as a pigment dispersant, a dispersion of resin-coated pigment particles in which the surfaces of pigment particles are covered with the water-insoluble resin may be obtained.

After the removal of the non-water-soluble volatile solvent, it is preferable that the non-water-soluble volatile solvent is substantially removed in the intended pigment dispersion. The residual amount of the non-water-soluble volatile solvent in the pigment dispersion is preferably 5% by mass or less of the mixed amount at the time of dispersion, from the viewpoints of condensation of the pigment dispersion, ejection performance when an ink composition is prepared, and suppression of curling. The residual amount of the non-water-soluble volatile solvent in the pigment dispersion is more preferably 1% by mass or less, and even more preferably 0.1% by mass or less.

The average particle diameter of the pigment particles dispersed in the pigment dispersion is preferably in a range of from 30 nm to 200 nm, and more preferably in a range of from 50 nm to 150 nm. When the average particle diameter is 30 nm or more, production suitability may be enhanced and, when the average particle diameter is 200 nm or less, storage stability may become more satisfactory. There is no particular limitation concerning the particle diameter distribution of the resin-coated pigment particles, and the resin-coated pigment particles may have a broad particle size distribution or a monodispersed particle size distribution.

Note that, the average particle diameter and particle diameter distribution of the pigment particles may be determined by measuring the volume average particle diameter in accordance with a dynamic light scattering method, using a NANOTRACK PARTICLE SIZE DISTRIBUTION MEASURER UPA-EX150 (trade name, manufactured by Nikkiso Co., Ltd.).

In the above description, the "pigment coated with an water-insoluble resin" is explained.

The content of the "pigment coated with an water-insoluble resin" in the ink composition of the present invention is not particularly limited, but is preferably from 0.05% by mass to 30% by mass, more preferably from 0.1% by mass to 20% by mass, and particularly preferably from 0.15% by mass to 15% by mass. When the content is 0.05% by mass or more, the occurrence of the phenomenon in which coloring property of the ink becomes insufficient may be more effectively suppressed. Further, when the content is 30% by mass or less, the increase in viscosity of the ink may be more effectively suppressed and deterioration in ink ejection stability and the like may be more effectively suppressed.

<Water-Insoluble Polymerpparticles Having Glass Transitionttemperature of 100° C. or Higher>

The ink composition of the present invention includes at least one type of water-insoluble polymer particles having a glass transition temperature Tg of 100° C. or higher (hereinafter, the water-insoluble polymer particles having a grass transition temperature Tg of 100° C. or higher may be also referred to as "polymer particles").

When the polymer particles are added to the ink composition, an image having abrasion resistance and press blocking resistance may be formed. Particularly, also under high temperature and high humidity conditions, excellent ejection recoverability may be obtained and an image having good blocking resistance may be formed.

There is no particular limitation on the polymer particles, as long as the glass transition temperature Tg is 100° C. or higher, but it is preferable that the polymer particles have self dispersibility (self-dispersing polymer particles).

The polymer particles have a glass transition temperature Tg of 100° C. or higher. When the glass transition temperature is lower than 100° C., abrasion resistance of the image may be deteriorated. From the viewpoint of improvement in the abrasion resistance of the image, Tg is preferably from 100° C. to 200° C., and more preferably from 120° C. to 180° C.

The glass transition temperature (Tg) of the self-dispersing polymer is a measured Tg value obtained by actual measurement. Specifically, the measured Tg value is a value measured using a differential scanning calorimeter (DSC) EXSTAR6220 manufactured by SII Nanotechnology Inc. under normal measurement conditions.

However, a calculated Tg value obtained according to the following Equation (1) is applied if a measurement is difficult due to, for example, decomposition of the polymer.

The calculated Tg value is obtained according to the following Equation (1).

$$1/Tg = \Sigma(Xi/Tgi) \qquad \text{Equation (1)}$$

Here, it is assumed that the polymer of which Tg value is to be calculated is formed by copolymerization of n types of monomer component denoted by i=1 to n. Xi represents the weight fraction of the i-th monomer ($\Sigma Xi=1$), and Tgi represents the glass transition temperature (expressed by an absolute temperature) of a homopolymer of the i-th monomer, wherein $\Sigma$ represents the sum for from i=1 to i=n. As the value of the glass transition temperature (Tgi) of a homopolymer of each monomer, the value described in J. Brandrup, E. H. Immergut *Polymer Handbook* (3rd Edition) (Wiley-Interscience, 1989), which is incorporated herein by reference, is used.

The term "self-dispersing polymer particles" refers to particles of a water-insoluble polymer that, when dispersed by a phase inversion emulsification method, can get into a dispersed state in an aqueous medium even in the absence of a surfactant due to functional groups (particularly, acid groups or salts thereof) of the polymer itself.

The scope of the term "dispersed state" used herein includes both an emulsified state (emulsion) in which a water-insoluble polymer in the liquid state is dispersed in an aqueous medium and a dispersed state (suspension) in which a water-insoluble polymer in the solid state is dispersed in an aqueous medium.

The self-dispersing polymer in the invention is preferably a self-dispersing polymer that can get into a dispersed state in which the water-insoluble polymer is dispersed in the solid state, in consideration of ink fixability when the self-dispersing polymer is contained in a ink composition.

A phase inversion emulsification method may be used as a method of achieving an emulsified state or dispersed state of the self-dispersing polymer (i.e., as a method of preparing an aqueous dispersion of the self-dispersing polymer). The phase inversion emulsification method may be, for example, a method including dissolving or dispersing the self-dispersing polymer in a solvent (for example, a hydrophilic organic solvent), directly adding the obtained liquid into water rather than adding a surfactant, stirring and mixing the resultant liquid in a state in which the salt-forming groups (such as acid groups) of the self-dispersing polymer are neutralized, and removing the solvent so as to obtain an aqueous dispersion that is in an emulsified or dispersed state.

The following procedure can be used to determine whether a self-dispersing polymer is in a stably emulsified or dispersed state a self-dispersing polymer as defined herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (sodium hydroxide if the salt-forming groups are anionic, or acetic acid if the salt-forming groups are cationic), the mixture is agitated with an agitator having an agitation blade at a rotation rate of 200 rpm at 25° C. for 30 minutes, and the organic solvent is removed from the mixture liquid. If a stable emulsion or dispersion state of the water-insoluble polymer in the mixture liquid and absence of precipitation are confirmed by visual observation for at least one week at 25° C. after the removal of the organic solvent, the water-insoluble polymer is considered to be in a stably emulsified or dispersed state.

The stability of the emulsified or dispersed state of the self-dispersing polymer can be confirmed also by an accelerated sedimentation test involving centrifugal separation. The stability in the accelerated sedimentation test involving centrifugal separation can be evaluated by, for example, adjusting the aqueous dispersion of the polymer particles obtained as described above to have a solids content of 25% by mass, centrifuging the resultant aqueous dispersion at 12,000 rpm for one hour, and measuring the solids content of a supernatant after the centrifugal separation.

If the ratio of the solids content after centrifugal separation to the solids content before centrifugal separation is large (a value close to 1), it is indicated that sedimentation of the polymer particles due to centrifugal separation does not occur; in other words, the aqueous dispersion of the polymer particles is more stable. In the invention, the ratio of the solids content after centrifugal separation to the solids content before centrifugal separation is preferably 0.8 or higher, more preferably 0.9 or higher, and particularly preferably 0.95 or higher.

The term "water-insoluble polymer" refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility described above is a value measured after the polymer is 100% neutralized with sodium hydroxide or acetic acid depending on the type of the salt-forming groups of the water-insoluble polymer.

In the self-dispersing polymer, the content of water-soluble components that exhibit water solubility when the self-dispersing polymer is in a dispersed state is preferably 10% by mass or less, more preferably 8% by mass or less, and still more preferably 6% by mass or less. When the content of the water-soluble components is 10% by mass or less, swelling of polymer particles and adhesion between polymer particles are effectively prevented, and a more stable dispersed state is maintained; further, an increase in viscosity of the ink composition is suppressed, and, when the ink composition is applied to, for example, an inkjet method, ejection stability is improved.

Here, the term "water-soluble components" refers to compounds that are contained in the self-dispersing polymer and that dissolve in water when the self-dispersing polymer is in a dispersed state. The water-soluble components are water-soluble compounds that are generated as by-products or incorporated during the preparation of the self-dispersing polymer.

The self-dispersing polymer may include at least one kind of hydrophilic structural unit derived from a hydrophilic monomer and at least one kind of hydrophobic structural unit derived from a hydrophobic monomer. The main chain skeleton of the self-dispersing polymer is not particularly limited, and is preferably a vinyl polymer, more preferably a (meth)acrylic polymer, from the viewpoint of dispersion stability of the polymer particles. The term "(meth)acrylic polymer refers to a polymer containing at least one of a structural unit derived from a methacrylic acid derivative or a structural unit derived from an acrylic acid derivative.

Hydrophilic Structural Unit

The hydrophilic structural unit in the invention is not particularly limited as long as the hydrophilic structural unit derives from a hydrophilic-group-containing monomer (hydrophilic monomer). The hydrophilic structural units of the self-dispersing polymer may derive from only one kind of hydrophilic-group-containing monomer or from two or more kinds of hydrophilic-group-containing monomer. The hydrophilic group is not particularly limited, and may be a dissociative group or a nonionic hydrophilic group.

The hydrophilic groups of the hydrophilic structural units of the self-dispersing polymer preferably include at least one kind of dissociative group, more preferably include an anionic dissociative group, from the viewpoints of enhancing self-dispersibility and improving stability of the emulsified or dispersed state obtained. Examples of the anionic dissociative group include a carboxyl group, a phosphoric acid group, and a sulfonic acid group. A carboxyl group is particularly preferable from the viewpoint of the fixability of an ink composition containing the self-dispersing polymer particles.

The hydrophilic-group-containing monomer is preferably a dissociative-group-containing monomer, and more preferably a dissociative-group-containing monomer having a dissociative group and an ethylenically unsaturated bond, from the viewpoint of self-dispersibility.

Examples of the dissociative-group-containing monomer include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxyethylsuccinic acid. Examples of the unsaturated sulfonic acid monomer include styrenesulfonic acid, 2-acrylamide-2-methylpropanesulfonic acid, 3-sulfopropyl (meth)acrylate, and bis-(3-sulfopropyl) itaconate. Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, and at least one of acrylic acid or methacrylic acid is more preferable, in consideration of dispersion stability and ejection stability.

Examples of monomers having a nonionic hydrophilic group include: 2-methoxyethyl acrylate; 2-(2-methoxyethoxy)ethyl acrylate; 2-(2-methoxyethoxy)ethyl methacrylate; ethylenically unsaturated monomers containing a (poly)ethyleneoxy group or a polypropyleneoxy group such as ethoxytriethyleneglycol methacrylate, methoxypolyethyleneglycol (molecular weight: from 200 to 1,000) monomethacrylate, polyethyleneglycol (molecular weight: from 200 to 1,000) monomethacrylate; and ethylenically unsaturated monomers having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate.

Ethylenically unsaturated monomers terminated with an alkyl ether are more preferable examples of monomers having a nonionic hydrophilic group than ethylenically unsaturated monomers terminated with a hydroxyl group, from the viewpoints of stability of the particles and the content of water-soluble components.

Regarding the hydrophilic structural unit, it is preferable that the self-dispersing polymer includes only at least one hydrophilic structural unit each having an anionic dissociative group or include both of (i) at least one hydrophilic structural unit each having an anionic dissociative group and (ii) at least one hydrophilic structural unit each having a nonionic hydrophilic group.

It is also preferable that the self-dispersing polymer includes two or more kinds of hydrophilic structural unit having an anionic dissociative group, or that the self-dispersing polymer includes two or more kinds of hydrophilic structural unit including at least one kind of hydrophilic structural unit having an anionic dissociative group and at least one kind of hydrophilic structural unit having a nonionic hydrophilic group.

The content of hydrophilic structural units in the self-dispersing polymer is preferably 25% by mass or less, more preferably from 1% by mass to 25% by mass, still more preferably from 2% by mass to 23% by mass, and particularly preferably from 4% by mass to 20% by mass, from the viewpoints of viscosity and temporal stability.

When the self-dispersing polymer includes two or more kinds of hydrophilic structural unit, the total content of the hydrophilic structural units is preferably within the above range.

The content of hydrophilic structural units each having an anionic dissociative group in the self-dispersing polymer is preferably such that the acid value is within the preferable range described below.

The content of structural units each having a nonionic hydrophilic group is preferably from 0% by mass to 25% by mass, more preferably 0% by mass to 20% by mass, and particularly preferably from 0% by mass to 15% by mass, from the viewpoints of ejection stability and temporal stability.

When the self-dispersing polymer has an anionic dissociative group, the acid value thereof (in terms of mgKOH/g) is preferably from 50 mgKOH/g to 75 mgKOH/g, more preferably from 52 mgKOH/g to 75 mgKOH/g, and still more preferably from 55 mgKOH/g to 72 mgKOH/g, from the viewpoints of self-dispersibility, the content of water-soluble components, and fixability of an ink composition containing the self-dispersing polymer particles. The acid value is particularly preferably from 60 mgKOH/g to 70 mgKOH/g.

An acid value of 50 mgKOH/g or higher is more likely to improve ejection response and ejection recoverability of an ink composition containing the self-dispersing polymer. An acid value of 75 mgKOH/g or lower is more likely to increase viscosity and improve blocking resistance.

Hydrophobic Structural Unit

The hydrophobic structural unit is not particularly limited as long as the unit is derived from a hydrophobic-group-containing monomer (hydrophobic monomer). The hydrophobic structural units of the self-dispersing polymer may derive from only one kind of hydrophobic-group-containing monomer, or from two or more kinds of hydrophobic-group-containing monomer. The hydrophobic group is not particularly limited, and may be a chain aliphatic group, a cyclic aliphatic group, or an aromatic group.

At least one kind of the hydrophobic monomers is preferably a cyclic-aliphatic-group-containing monomer, and more preferably include a (meth)acrylate containing a cyclic aliphatic group (hereinafter referred to as "alicyclic (meth)acrylate" in some cases), from the viewpoints of blocking resistance, abrasion resistance, and dispersion stability.

—Alicyclic (meth)acrylate—

The term "alicyclic (meth)acrylate" refers to a compound which includes a moiety derived from (meth)acrylic acid and a moiety derived from an alcohol (hereinafter referred to as alcohol-derived moiety in some cases), and has at least one substituted or unsubstituted alicyclic hydrocarbon group at the moiety derived from an alcohol. The alicyclic hydrocarbon group may be the alcohol-derived moiety itself, or may be bonded to an alcohol-derived portion via a linking group.

Thus, the alicyclic (meth)acrylate is a methacrylate or acrylate having an alicyclic hydrocarbon group.

The alicyclic hydrocarbon group is not particularly limited as long as it contains a cyclic non-aromatic hydrocarbon group. Examples thereof include monocyclic hydrocarbon groups, bicyclic hydrocarbon groups, and polycyclic hydrocarbon group having three or more rings.

Examples of alicyclic hydrocarbon groups include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and a bicyclo[4.3.0]nonyl group.

The alicyclic hydrocarbon group may have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group.

The alicyclic hydrocarbon group may include a condensed ring.

The number of carbons in the alicyclic hydrocarbon group is preferably from 5 to 20 from the viewpoints of viscosity and solubility.

Preferable examples of the linking group that connects the alicyclic hydrocarbon group and the alcohol-derived portion include an alkyl group, an alkenyl group, an alkylene group, an aralkyl group, an alkoxy group, a monoethyleneglycol group, an oligoethyleneglycol group, a monopropyleneglycol group, and an oligopropyleneglycol group, each of which has from 1 to 20 carbon atoms.

Specific examples of the alicyclic (meth)acrylate include, but are not limited to in the invention, the following.

Examples monocyclic (meth)acrylates include a cycloalkyl (meth)acrylate of which cycloalkyl group has from 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of bicyclic (meth)acylates include isobornyl (meth)acrylate and norbornyl (meth)acrylate.

Examples of tricyclic (meth)acrylates include adamantyl (meth)acrylate, dicyclopentanyl (meth)acrylate, and dicyclopentenyloxyethyl (meth)acrylate.

The alicyclic (meth)acrylate may be used singly, or two or more alicyclic (meth)acrylates may be used in mixture.

The self-dispersing polymer preferably includes hydrophobic structural units derived from at least one alicyclic (meth)acrylate selected from bicyclic (meth)acrylates and polycyclic (meth)acrylates having three or more rings, and more preferably includes hydrophobic structural units derived from at least one of isobornyl (meth)acrylate, adamantyl (meth)acrylate, or dicyclopentanyl (meth)acrylate, from the viewpoints of the dispersion stability of the self-dispersing polymer particles, fixability, and blocking resistance.

In the invention, the content ratio of alicyclic (meth)acrylate-derived structural units contained in the self-dispersing polymer particles is preferably from 20% by mass to 90% by mass, and more preferably from 40% by mass to 90% by mass, from the viewpoints of improving the stability of the self-dispersing state, enhancing the stability of the particle shape in an aqueous medium through hydrophobic interactions between alicyclic hydrocarbon groups, and decreasing the amount of water-soluble components by an appropriate degree of hydrophobization of the particles. The content ratio of alicyclic (meth)acrylate-derived structural units contained in the self-dispersing polymer particles is particularly preferably from 50% by mass to 80% by mass.

Fixability and blocking resistance are improved by adjusting the content ratio of alicyclic (meth)acrylate-derived structural units to 20% by mass or higher. The stability of the polymer particles is improved by adjusting the content ratio of alicyclic (meth)acrylate-derived structural units to 90% by mass or lower.

As necessary, the self-dispersing polymer in the invention may further include other additional structural units as hydrophobic structural units, in addition to the alicyclic (meth)acrylate-derived structural units. The monomers for forming the additional structural units are not particularly limited as long as they are copolymerizable with the alicyclic (meth)acrylate and the hydrophilic-group-containing monomer, and may be a known monomer.

Specific examples of monomers for forming the additional structural units (hereinafter referred to as other copolymerizable monomers or additional copolymerizable monomers) include: alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; aromatic-ring-containing (meth)acrylates such as benzyl (meth)acrylate and phenoxyethyl (meth)acrylate; styrenes such as styrene, α-methylstyrene, and chlorostyrene; dialkylaminoalkyl (meth)acrylates such as dimethylaminoethyl (meth)acrylate; and (meth)acrylamides such as N-hydroxyalkyl (meth)acrylamides (such as N-hydroxymethyl (meth)acrylamide, N-hydroxyethyl (meth)acrylamide, and N-hydroxybutyl (meth)acrylamide) and N-alkoxyalkyl (meth)acrylamides (such as N-methoxymethyl (meth)acrylamide, N-ethoxymethyl (meth)acrylamide, N-(n-/iso)butoxymethyl (meth)acrylamide, N-methoxyethyl (meth)acrylamide, N-ethoxyethyl (meth)acrylamide, and N-(n-/iso)butoxyethyl (meth)acrylamide).

The additional copolymerizable monomers preferably include at least one (meth)acrylate containing a chain alkyl group having from 1 to 8 carbon atoms, more preferably include a (meth)acrylate having a chain alkyl group having from 1 to 4 carbon atoms, and particularly preferably include methyl (meth)acrylate and/or ethyl (meth)acrylate, from the viewpoints of ease of controlling the flexibility of polymer skeleton and glass transition temperature (Tg) and dispersion stability of the self-dispersing polymer. Here, the chain alkyl group refers to an alkyl group having a linear chain or a branched chain.

In the invention, use of a (meth)acrylate containing an aromatic group is also preferable.

When one or more aromatic-group-containing (meth)acrylates are contained as additional copolymerizable monomers, the content ratio of structural units derived from aromatic-group-containing (meth)acrylates is preferably 40% by mass or lower, more preferably 30% by mass or lower, and particularly preferably 20% by mass or lower, relative to the total mass of the self-dispersing polymer, from the viewpoint of the dispersion stability of the self-dispersing polymer particles.

When one or more styrenic monomers are used as additional copolymerizable monomers, the content ratio of structural units derived from styrenic monomers is preferably 20% by mass or lower, more preferably 10% by mass or lower, and still more preferably 5% by mass or lower, relative to the total mass of the self-dispersing polymer, from the viewpoint of the dispersion stability of the self-dispersing polymer particles. It is particularly preferable that the self-dispersing polymer does not include a structural unit derived from a styrenic monomer, from the viewpoint of the dispersion stability of the self-dispersing polymer particles.

Here, the term "styrenic monomer" encompasses styrene, substituted styrenes (α-methylstyrene, chlorostyrene, etc.), and styrene macromers having a polystyrene structural unit.

An additional polymerizable monomer may be used singly, or two or more additional polymerizable monomers may be used in combination.

When the self-dispersing polymer includes additional structural units, the content thereof is preferably from 10% by mass to 80% by mass, more preferably from 15% by mass to 75% by mass, and particularly preferably from 20% by mass to 70% by mass, relative to the total mass of the self-dispersing polymer. When two or more monomers for forming additional structural units are used in combination, the total content thereof is preferably within the above range.

The self-dispersing polymer is preferably a polymer obtained by copolymerization of at least three monomers including an alicyclic (meth)acrylate, an additional copolymerizable monomer, and a hydrophilic-group-containing monomer, and is more preferably a polymer obtained by copolymerization of at least three monomers including an alicyclic (meth)acrylate, an alkyl-group-containing (meth)acrylate having a C1 to C8 linear or branched chain, and a hydrophilic-group-containing monomer, from the viewpoint of dispersion stability.

In the invention, from the viewpoint of dispersion stability, it is preferable that the self-dispersing polymer does not substantially include a structural unit having a highly-hydrophobic substituent derived from a (meth)acrylate having a linear or branched chain alkyl group having 9 or more carbon atoms or from an aromatic-group-containing macromonomer, and it is more preferable that the self-dispersing polymer does not substantially include a structural unit having a highly-hydrophobic substituent derived from a (meth)acrylate having a linear or branched chain alkyl group having 9 or more carbon atoms or from an aromatic-group-containing macromonomer, at all.

The self-dispersing polymer may be a random copolymer in which respective kinds of structural unit are introduced irregularly, or a block copolymer in which respective kinds of structural unit are introduced regularly. When the self-dispersing polymer is a block copolymer, the block copolymer may be synthesized by introducing the respective kinds of structural unit thereof in any order, and a same kind of constituent component may be used more than once. The self-dispersing polymer is preferably a random copolymer from the viewpoints of versatility and productivity.

The molecular weight range of the self-dispersing polymer, in terms of weight average molecular weight, is preferably from 3,000 to 200,000, and more preferably from 10,000 to 200,000, and still more preferably from 30,000 to 150,000. A weight average molecular weight of 3,000 or more may effectively reduce the amount of water-soluble components. A weight average molecular weight of 200,000 or less may enhance self-dispersing stability.

The weight average molecular weight can be measured with a gel permeation chromatograph (GPC).

The self-dispersing polymer preferably has an acid value of from 50 mgKOH/g to 75 mgKOH/g, more preferably from 52 mgKOH/g to 75 mgKOH/gs, still more preferably from 55 mgKOH/g to 72 mgKOH/g, and particularly preferably from 60 mgKOH/g to 70 mgKOH/g, from the viewpoints of viscosity control, ejection response, and ejection recoverability of the ink composition.

An acid value of 50 mgKOH/g or higher is more likely to improve ejection response and ejectability recovery properties of an ink composition containing the self-dispersing polymer, an acid value of 75 mgKOH/g or lower is more likely to increase viscosity.

In the invention, the acid value can be measured according to the method described in JIS standard (JIS K0070: 1992), the disclosure of which incorporated by reference herein.

The self-dispersing polymer preferably has a neutralization degree of from 40 to 60%, more preferably from 45 to 55%, and particularly preferably from 47 to 53%, from the viewpoints of viscosity control, ejection response, and ejection recoverability properties.

A neutralization degree of the self-dispersing polymer of 40% or higher may increase viscosity and improve ejection response. A neutralization degree of the self-dispersing polymer of 60% or lower may improve ejection recoverability.

A neutralization degree of lower than 40% or higher than 60% may cause disadvantages such as inability to stably produce a self-dispersing polymer.

The term "neutralization degree" refers to the amount of alkali, in terms of % by mol, that is added during the preparation of a self-dispersing polymer, assuming that the amount of the dissociative groups contained in the self-dispersing polymer chain is 100% by mol.

In regard to the combination of the acid value and neutralization degree of the self-dispersing polymer, it is preferable that the acid value is from 52 mgKOH/g to 75 mgKOH/g and the neutralization degree is from 45 to 55%, and it is more preferable that the acid value is from 55 mgKOH/g to 72 mgKOH/g and the neutralization degree is from 45 to 55%, and it is still more preferable that the acid value is from 55 mgKOH/g to 65 mgKOH/g and the neutralization degree is from 47 to 53%.

From the viewpoint of hydrophilicy-hydrophobicity control of the polymer, the self-dispersing polymer is preferably a vinyl polymer which includes at least one type of structure derived from an alicyclic (meth)acrylate at a total copolymerization ratio of from 20% by mass to 90% by mass, at least one type of structure derived from a dissociative-group-containing monomer, and at least one type of structure derived from a (meth)acrylate containing a C1 to C8 chain alkyl group, and which has an acid value of from 20 to 120 and a weight average molecular weight of from 3,000 to 200,000, and in which the total content of hydrophilic structural units is 25% by mass or lower, more preferably a vinyl polymer which includes at least one type of structure derived from a bicyclic or polycyclic (tri- or higher-cyclic) (meth)acrylate at a total copolymerization ratio of from 20% by mass to less than 90% by mass, at least one type of structure derived from a (meth)acrylate containing a C1 to C4 chain alkyl group at a total copolymerization ratio of from 10% by mass to less than 80% by mass, and at least one type of structure derived from a carboxyl-group-containing monomer at such a total copolymerization ratio that the acid value of the self-dispersing polymer is from 50 mgKOH/g to 75 mgKOH/g, and which has a weight average molecular weight of from 10,000 to 200,000, and in which the total content of hydrophilic structural units is 25% by mass or lower, and particularly preferably a vinyl polymer which includes at least one type of structure derived from a bicyclic or polycyclic (tri- or higher-cyclic) (meth)acrylate at a total copolymerization ratio of from 40% by mass to less than 80% by mass, at least one type of structure derived from methyl (meth) acrylate or ethyl (meth)acrylate at a total copolymerization ratio of from 20% by mass to less than 60% by mass, and at least one type of structure derived from acrylic acid or methacrylic acid at such a total copolymerization ratio that the acid value of the self-dispersing polymer is from 50 mgKOH/g to 75 mgKOH/g, and which has a weight average molecular weight of from 30,000 to 150,000, and in which the total content of hydrophilic structural units is 25% by mass or lower.

Exemplary compounds, which are specific examples of the self-dispersing polymer, are described below. However, the invention is not limited thereto. The numbers in parentheses indicate ratios by mass of copolymerization components.

Methyl methacrylate/isobornyl methacrylate/methacrylic acid (20/72/8) copolymer having a glass transition temperature of 180° C., and an acid value of 52.1

Methyl methacrylate/isobornyl methacrylate/methacrylic acid (40/52/8) copolymer having a glass transition temperature of 160° C., and an acid value of 52.1

Methyl methacrylate/isobornyl methacrylate/methacrylic acid (38/52/10) copolymer having a glass transition temperature of 160° C., and an acid value of 65.1

Methyl methacrylate/isobornyl methacrylate/methacrylic acid (42/52/6) copolymer having a glass transition temperature of 161° C., and an acid value of 39.1

Methyl methacrylate/isobornyl methacrylate/methacrylic acid (36.5/52/11.5) copolymer having a glass transition temperature of 160° C., and an acid value of 74.8

Methyl methacrylate/isobornyl methacrylate/methacrylic acid (36/52/12) copolymer having a glass transition temperature of 160° C., and an acid value of 78.1

Methyl methacrylate/isobornyl methacrylate/dicyclopentanyl methacrylate/methacrylic acid (20/62/10/8) copolymer having a glass transition temperature of 170° C., and an acid value of 52.1

Methyl methacrylate/dicyclopentanyl methacrylate/methacrylic acid (20/72/8) copolymer having a glass transition temperature of 160° C., and an acid value of 52.1

Methyl methacrylate/dicyclopentanyl methacrylate/methacrylic acid (18/72/10) copolymer having a glass transition temperature of 161° C., and an acid value of 65.1

The method for preparing a self-dispersing polymer is not particularly limited, and the self-dispersing polymer can be prepared by copolymerizing a monomer mixture according to a known polymerization method. Among polymerization methods, polymerization in an organic medium is preferable, and a solution polymerization method is particularly preferable, from the viewpoint of ejection stability of an ink composition containing the self-dispersing polymer.

In the method for preparing a self-dispersing polymer, a self-dispersing polymer may be prepared by subjecting a mixture containing a monomer mixture and, optionally, an organic solvent and/or a radical polymerization initiator to a copolymerization reaction under an inactive gas atmosphere.

The method for producing an aqueous dispersion of self-dispersing polymer particles is not particularly limited, and an aqueous dispersion of self-dispersing polymer particles may be produced according to a known method. A step of obtaining an aqueous dispersion of self-dispersing polymer is preferably a phase inversion emulsification method that includes the following steps (1) and (2):

Step (1): a step of agitating a mixture containing a self-dispersing polymer, an organic solvent, a neutralizing agent, and an aqueous medium to obtain a dispersion Step (2): a step of removing at least a part of the organic solvent from the resultant dispersion The step (1) is preferably a process in which the self-dispersing polymer is dissolved in the organic solvent, and then the neutralizing agent and the aqueous medium are gradually added to the polymer solution and mixed, by agitation, with the polymer solution to form a dispersion. When the neutralizing agent and the aqueous medium are added to the self-dispersing polymer solution in which the self-dispersing polymer is dissolved in the organic solvent as in the above process, self-dispersing polymer particles of which diameter is highly stable during storage can be obtained without requiring a strong shearing force.

The method of agitating the mixture is not particularly limited, and may be a method using a generally-used mixing and agitating apparatus and/or, if necessary, a disperser such as an ultrasonic disperser or a high-pressure homogenizer.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone together; using the solvents together makes it possible to obtain self-dispersing polymer particles having a very small particle diameter that are free from aggregation precipitation or adhesion between particles and that have high dispersion stability. The reasons for exerting these effects are thought to include, for example, a milder polarity change at the time of phase inversion from an oil phase to an aqueous phase.

The neutralizing agent is used to neutralize all or some of the dissociative groups of the self-dispersing polymer so as to allow the self-dispersing polymer particles to get into a stable emulsified or dispersed state in water. When the self-dispersing polymer has an anionic dissociative group as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of stabilizing the dispersed state of the self-dispersing polymer particles of the invention in water.

In the step (2), the organic solvent is removed from the dispersion obtained by the step (1) using a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the remaining organic solvent is preferably 0.2% by mass or less, and more preferably 0.1% by mass or less.

The volume average particle diameter (hereinafter simply referred to as "average particle diameter" in some cases) of the self-dispersing polymer particles in the invention is preferably in the range of from 0.1 nm to 10 nm. When the volume average particle diameter is less than 0.1 nm, the viscosity increases excessively, thereby deteriorating ejection recoverability. When the volume average particle diameter is more than 10 nm, the effects in increasing viscosity are reduced.

Within the above average particle diameter range, an average particle diameter of from 0.5 nm to 8 nm is preferable, an average particle diameter of from 1 nm to 7 nm is more preferable, an average particle diameter of from 1 nm to 5 nm is still more preferable, and an average particle diameter of from 1 nm to 4 nm is particularly preferable, in view of viscosity increase and ejection properties (such as ejection response and ejection recoverability).

The above particle diameter range is preferable in that an average particle diameter of 0.1 nm or more increases production suitability and ejection recoverability, and that an average particle diameter of 10 nm or less improves storage stability and ink viscosity increasing effects. When the self-dispersing polymer exerts viscosity increasing effects as well as self-dispersibility, the amount of thickener to be added can resultantly be decreased, and ejection response can thus be improved.

The particle diameter distribution of the self-dispersing polymer particles is not particularly limited, and may have a broad particle diameter distribution or a monodispersed particle diameter distribution. Two or more types of self-dispersing particles may be used in mixture.

The average particle diameter and particle diameter distribution of the self-dispersing polymer particles can be measured using, for example, a light scattering method.

It is preferable that the self-dispersing polymer particles in the ink composition of the invention do not substantially contain a pigment.

The self-dispersing polymer particles in the invention have excellent self-dispersibility, and the stability observed when the self-dispersing polymer particles are dispersed alone is remarkably high. However, the self-dispersing polymer particles do not have high capability as, for example, a dispersant, which stably disperses a pigment. Therefore, when the self-dispersing polymer particles in the invention are present in the ink composition that contains a pigment, the stability of the entire ink composition is resultantly be greatly lowered in some cases.

The ink composition of the invention may include water-insoluble polymer particles (preferably, self-dispersing polymer particles) of only one type, or a mixture of two or more types of self-dispersing polymer particles.

The content of water-insoluble polymer particles (preferably, self-dispersing polymer particles) in the ink composition of the invention is preferably 5% by mass of higher, more preferably from 5% by mass to 30% by mass, still more preferably from 5% by mass to 20% by mass, and particularly preferably from 5% by mass to 10% by mass, with respect to the total mass of the ink composition, from the viewpoint of abrasion resistance and press blocking resistance.

In the ink composition of the invention, the content ratio of pigment particles to self-dispersing polymer particles (pigment particles/self-dispersing polymer particles) is preferably in the range of from 1/0.5 to 1/10, and more preferably in the range of from 1/1 to 1/4, from the viewpoint of, for example, abrasion resistance of an image.

<Solid Moistening Agent>

The ink composition of the invention includes at least one solid moistening agent.

Incorporation of a solid moistening agent into the ink composition may result in improvement in press blocking resistance and ink ejection performance.

As used in the invention, the term "solid moistening agent" refers to a water-soluble compound which has water retention capability and which is solid at 25° C.

General solid moistening agents for use in aqueous ink compositions, as they are, may be used as solid moistening agents. Specific examples thereof include polyhydric alcohols such as saccharides, sugar alcohols, hyaluronic acids, trimethylolpropane, and 1,2,6-hexanetriol, urea, and urea derivatives.

Herein, a "derivative" of a specific compound means a compound obtained by substituting, for an atom or an atomic group which is a partial structure of the specific compound, another atom or another atomic group.

Examples of the urea derivatives include thiourea, a compound obtained by replacing a hydrogen on the nitrogen of urea by an alkyl group or alkanol, and a compound obtained by replacing a hydrogen of the nitrogen of thiourea by an alkyl group or alkanol. Specific examples thereof include N,N-dimethylurea, thiourea, ethyleneurea, hydroxyethylurea, hydroxybutylurea, ethylenethiourea, and diethylthiourea.

Examples of the saccharides include monosaccharides, disaccharides, oligosaccharides such as trisaccharides and tetrasaccharides, and polysaccharides. Specific examples thereof include glucose, mannose, fructose, ribose, xylose, arabinose, galactose, aldonic acid, glucitol, sorbitol, maltose, cellobiose, lactose, sucrose, trehalose, and maltotriose. As used herein, the term "polysaccharide" refers to a sugar in a broad sense, and encompasses substances widely spread in nature, such as alginic acid, α-cyclodextrin, and cellulose. Examples of derivatives of saccharides include reducing sugars (such as sugar alcohols) of the above saccharides, and oxidized sugars (such as aldonic acids, uronic acids, amino acids, and thiosugars) of the above saccharides. In particular, sugar alcohols are preferable, and specific examples thereof include maltitol, sorbitol, and xylitol. A commercially available 1% aqueous solution of sodium hyaluronate (molecular weight 350,000) may be used as a salt of hyaluronic acid.

Among them, urea and urea derivatives are more preferable for use as solid moistening agents in the invention, due to their high moisture retention capability.

The content of solid moistening agent in the ink composition of the invention is preferably from 5% by mass to 30% by mass, and more preferably from 5% by mass to 20% by mass, from the viewpoint of improving ejection stability.

The combination of the content of solid moistening agent in the ink composition of the invention and the content of polymer particles in the ink composition is not particularly limited, and the following combinations are preferable from the viewpoint of more effectively achieving both of ink ejection performance, abrasion resistance, and blocking resistance.

Specifically, it is preferable that the content of solid moistening agent is 5% by mass or higher and that the content of polymer particles is 5% by mass or higher. It is more preferable that the content of solid moistening agent is from 5% by mass to 20% by mass and that the content of polymer particles is from 5% by mass to 20% by mass. It is particularly preferable that the content of solid moistening agent is from 5% by mass to 10% by mass and that the content of polymer particles is from 5% by mass to 10% by mass.

The ratio of the solid moistening agent content to the total solids content (including the contents of the water-insoluble polymeric dispersant, the pigment, and the polymer particles) of the ink composition (the mass of solid moistening agent/ the total mass of solids) is preferably 0.3 or higher, more preferably in the range of from 0.4 to 2.0, and most preferably in the range of from 0.5 to 1.5.

<Water-Soluble Organic Solvent>

The ink composition of the present invention contains water as a solvent. However, it is preferable that the ink composition further contains at least one water-soluble organic solvent. Water-soluble organic solvents can be used as an anti-drying agent or a permeation accelerator. In the case of using a water-soluble organic solvent as an anti-drying agent, when image recording is performed by ejecting the ink composition in accordance with an inkjet method, clogging of nozzle which may possibly be caused by drying of an ink at an ink ejection port can be effectively prevented.

The term "water-soluble" in the present invention means that the solubility in water at 25° C. is 1 g/100 g or more.

For the purpose of anti-drying, a water-soluble organic solvent having a vapor pressure lower than that of water is preferably used. Specific examples of the water-soluble organic solvent which may be suitably used for anti-drying include polyhydric alcohols such as those represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane, and the like; lower alkyl ethers of a polyhydric alcohol such as ethylene glycol monomethyl ether, ethylene glycol monoethyl ether, diethylene glycol monomethyl ether, diethylene glycol monoethyl ether, triethylene glycol monoethyl ether, and triethylene glycol monobutyl ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide, and 3-sulfolene; and polyfunctional compounds such as diacetone alcohol and diethanolamine.

Among them, polyhydric alcohols such as glycerin and diethylene glycol are preferable. These water-soluble organic solvents may be used alone or in a combination of two or more of them. It is preferable that the above water-soluble organic solvent is contained in the ink composition in an amount of from 10% by mass to 50% by mass.

For the purpose of permeation acceleration, a water-soluble organic solvent is preferably used, from the viewpoint of well penetrating the ink composition into a recording medium. Specific examples of the water-soluble organic solvent which may be suitably used for penetration acceleration include alcohols such as ethanol, isopropanol, butanol, diethylene glycol monobutyl ether, triethylene glycol monobutyl ether, and 1,2-hexanediol; sodium lauryl sulfate; sodium oleate; and nonionic surfactants. When the above water-soluble organic solvent is contained in the ink composition in an amount of from 5% by mass to 30% by mass, sufficient effect may be obtained. The water-soluble organic solvent is preferably used within the range of the addition amount such that bleeding of the printing or image, or print-through is not generated.

A water-soluble organic solvent can also be used for the purpose of adjusting viscosity, besides the above purposes. Specific examples of the water-soluble organic solvent that can be used for adjusting viscosity include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

One of the water-soluble organic solvents may be used alone, or two or more of them may be used as a mixture.

<Wax Having Melting Point of 40° C. or Higher But Lower Than 100° C.>

The ink composition contains particles of wax having a melting point of 40° C. or higher but lower than 100° C. (hereinafter, may be simply referred to as "wax"). Incorporation of the wax particles may result in enhancement of press blocking resistance of the image.

The wax of the wax particles is not particularly limited as long as the wax has a melting point of 40° C. or higher but lower than 100° C., and the types of wax may include natural wax and synthetic wax.

Examples of the natural wax include petroleum-derived waxes (petroleum waxes), vegetable-derived waxes (vegetable waxes), and vegetable and animal derived waxes.

Examples of the petroleum-derived waxes may include paraffin wax, microcrystalline wax, and petrolatum. Examples of the vegetable-derived waxes may include carnauba wax, candelilla wax, rice wax, and Japan tallow. Examples of the vegetable and animal derived waxes may include lanolin and beeswax.

Examples of the synthetic wax include synthetic hydrocarbon waxes and modified waxes.

Examples of the synthetic hydrocarbon waxes include polyethylene waxes and Fisher-Tropsch waxes. Examples of the modified waxes may include paraffin wax derivatives, montan wax derivatives, and microcrystalline wax derivatives.

Among the above waxes, paraffin wax including hydrocarbon having from 20 to 40 carbon atoms as the main component is preferable from the viewpoints of being excellent in feeling of image gloss, prevention of moisture vaporization from the nozzle tip, and moisture retention effect.

Further, polyethylene wax exhibits good compatibility with a resin, and therefore, polyethylene wax is preferable in view of ease of forming uniform and good images. Furthermore, polyethylene wax may be easily modified, and glycol-modified polyethylene wax obtained by modifying the polyethylene wax is more preferable, since wettability originating from glycol can be given, and therefore, wettability effects of the ink composition can be demonstrated at the nozzle tip and ejection stability may be made more effectively.

In the present invention, among the above waxes, at least one selected from among the vegetable-derived waxes and the petroleum-derived waxes is preferably used, from the viewpoint of further improvement in the press blocking resistance.

The melting point of the specific wax is 40° C. or higher but lower than 100° C. When the melting point is lower than 40° C., press blocking resistance may be deteriorated and, when the melting point is 100° C. or higher, ejection performance may be deteriorated. From the viewpoint of improvement in the press blocking resistance, the melting point of the specific wax is preferably 45° C. or higher but lower than 100° C., and more preferably from 50° C. to 95° C.

The wax used in the present invention is used as wax particles. The wax is preferably added in the form of a dispersion (especially, emulsion), and water is preferably used as the solvent, but the invention is not limited thereto. For example, an ordinary organic solvent may be selected as appropriate and used at the time of dispersion. Examples thereof may include ketones (acetone, methyl ethyl ketone, methyl isobutyl ketone, cyclohexanone, and the like), alcohols (lower alcohol having from 1 to 8 carbon atoms, for example, methyl alcohol, ethyl alcohol, isopropyl alcohol, butyl alcohol, hexyl alcohol, octyl alcohol, and the like), glycol derivatives (cellosolve, ethylene glycol diethyl ether, propylene glycol monomethyl ether, and the like), esters of a lower fatty acid having from 1 to 5 carbon atoms (ethyl acetate, butyl acetate, ethyl propionate, and the like), haloalkanes (methylene dichloride, ethylene dichloride, trichlene, trichloromethane, trichloroethane, carbon tetrachloride, and the like), hydrocarbons (octane, solvent naphtha, turpentine oil, petroleum ether, thinner, petroleum benzine, benzene, toluene, xylene, and the like), phenols (phenol, resorcinol, and the like), ethers (tetrahydrofuran, dioxane, and the like), phosphoric acid esters (trimethyl phosphate, triethyl phosphate, tributyl phosphate, and the like), and amide-based solvents such as DMF (N,N-dimethylformamide) and DMSO (dimethyl sulfoxide). Among them, alcohols, ketones, glycol derivatives, lower fatty acid esters, haloalkanes, hydrocarbons are preferable. Particularly, in the solvent system in which water is used in combination as a mixture, a solvent selected from the group consisting of alcohols, ketones, and glycol derivatives, which form a uniform solvent with water, is preferably used; and in a case in which water is not used, a solvent selected from the group consisting of hydrocarbons, ketones, lower fatty acid esters, and haloalkanes is preferably used.

By the use of such organic solvent, the stability of the wax dispersion becomes excellent. The organic solvents described above may be mixed with two or more of the same kind or different kinds of solvent for use.

Next, the wax dispersed particles used in the present invention are explained in more detail.

In the present invention, it is preferable to use the wax in combination with a dispersion stabilizer (preferably, a dispersion stabilizer represented by Formula (1) described below), from the viewpoints of improvement in press blocking resistance and ink ejection performance (just after ejection and after a period of time from ejection). The constitution ratio of the wax and the dispersion stabilizer in the wax dispersed particles including the wax and the dispersion stabilizer is not particularly limited, but it is preferable to use wax dispersed particles prepared from 25% by mass to 99% by mass of the wax and from 1% by mass to 75% by mass of the dispersion stabilizer. This is because, as the content of the wax is higher, the characteristics of the wax dispersed particles may be more strongly demonstrated.

Accordingly, it is preferable that the proportion of the dispersion stabilizer represented by Formula (1) in the wax dispersed particles is as low as possible.

The wax dispersed particles used in the present invention are preferably prepared by mixing the constituent compounds at a temperature higher than any of the melting points of the constituent compounds in advance of being dispersed, namely the wax dispersed particles are preferably prepared by melt-mixing the constituent compounds before dispersion. Then, the solvent to be used as the dispersion medium may be similarly heated to a high temperature and the melt-mixed substance may be added thereto, and then the mixture may be finely dispersed by various dispersing methods. It is also preferable to add a heated solvent to the melt-mixed substance and then perform dispersion and pulverization. Further, another method including dissolving the wax and the dispersant in a non-aqueous organic solvent that dissolves the wax and the dispersion stabilizer, then finely dispersing the resulting liquid in water by utilizing another water-soluble surfactant, and adding the resultant as it is, as the wax dispersed particles, may be employed. For example, ethyl acetate or the like is preferably used as the non-aqueous organic solvent.

Furthermore, it is also useful to remove the organic solvent after dispersion, and to utilize the resultant as the wax particle dispersion. This case is advantageous in that, even though the melting points of the wax and the compound represented by Formula (1) are each 100° C. or higher, the wax and the compound represented by Formula (1) can be dissolved and mixed in an organic solvent at a lower temperature, so that high melting point-wax dispersed particles can be produced in an aqueous system. Here, the melting point of the compound represented by Formula (1) is not particularly limited, but the effective melting point is preferably from 50° C. to 200° C., more preferably from 60° C. to 200° C., and particularly preferably from 70° C. to 150° C. As the solvent, water is most preferable in the preparation of the ink composition of the invention from the viewpoint that water is environmentally-friendly. Accordingly, in the case of using a wax having a melting point of 80° C., the temperature of water needs to be elevated to 80° C. or higher at the time of dispersion.

The wax in the present invention may be incorporated in the ink composition by any method such as a method of adding the wax in the form of a solution in which the wax is dissolved in an appropriate solvent, in the form of an emulsified dispersion, or in the form of a solid particle dispersion.

An examples of an emulsion dispersing method that is well known in the technical field is a method including dissolving the wax in an oil such as dibutyl phthalate, tricresyl phosphate, dioctyl sebacate, or tri(2-ethylhexyl) phosphate, using an auxiliary solvent such as ethyl acetate or cyclohexanone, and adding an dispersion stabilizer described below, followed by mechanically preparing an emulsified dispersion. In this process, it is preferable to add a polymer such as an α-methylstyrene oligmer, or poly(t-butylacrylamide), for the purpose of adjusting the viscosity or refractive index of the oil droplets.

Examples of a solid particle dispersing method include a method including dispersing the powder of the wax in a proper solvent such as water or the like, by means of a ball mill, a colloid mill, a vibrating ball mill, a sand mill, a jet mill, a roller mill, or ultrasonics, thereby obtaining a solid dispersion. In this process, a protective colloid (for example, polyvinyl alcohol) or a surfactant (for example, an anionic surfactant such as sodium triisopropylnaphthalenesulfonate (a mixture of compounds having the three isopropyl groups at different substitution sites)) may be used. In the mills described above, beads of zirconia or the like are generally used as the dispersion media. In a water-based dispersion, an antiseptic (for example, benzoisothiazolinone sodium salt) is preferably added.

Particularly, an emulsion dispersing method is preferable. The wax is preferably added to the ink composition in the form of particles having an average particle size of from 0.01 µm to 10 µm, more preferably from 0.05 µm to 5 µm, and even more preferably from 0.1 µm to 2 µm.

The content of wax in the ink composition is preferably 0.001% by mass to 20% by mass in terms of the solids concentration of wax, from the viewpoints of improvement in abrasion resistance, press blocking resistance, and ink ejection performance (just after ejection and after a period of time from ejection). The content is more preferably from 0.01% by mass to 10% by mass, and even more preferably from 0.1% by mass to 5% by mass.

Dispersion Stabilizer

The ink composition preferably contains at least one dispersion stabilizer, and the dispersion stabilizer is preferably used in combination with the above wax, from the viewpoint of further enhancing the ink ejection performance.

The dispersion stabilizer used in the present invention may be used by selecting from among numerous dispersion stabilizers which are conventionally known to those skilled in the art. In the present invention, the dispersion stabilizer is particularly preferably a dispersion stabilizer represented by the following Formula (1).

$(R^3)a\text{-}G\text{-}(D)d$  Formula (1)

In Formula (1), $R^3$ represents a substituted or unsubstituted alkyl group, alkenyl group, aralkyl group, or aryl group, each of which has from 10 to 60 carbon atoms; G represents a linking group having a valency of from 2 to 7; D represents $(B)_n$-E, wherein B represents —$CH_2CH_2O$—, —$CH_2CH_2CH_2O$—, —$CH(CH_3)CH_2O$—, or —$CH_2CH(OH)CH_2O$—, n represents an integer of from 1 to 50, and E represents hydrogen, or a substituted or unsubstituted alkyl group, aryl group, alkylcarbonyl group, or arylcarbonyl group, each of which has from 1 to 8 carbon atoms; a and d each independently represent an integer of from 1 to 6; and plural $R^3$s, Ds, and Es may be the same as or different from each other, respectively.

The compound represented by Formula (1) is explained in more detail.

$R^3$ represents a substituted or unsubstituted, straight chain, branched, or cyclic alkyl group, alkenyl group, or aralkyl group, each of which has from 10 to 60 carbon atoms; or a substituted or unsubstituted aryl group having from 10 to 60 carbon atoms. Preferable examples of the group represented by $R^3$ include $C_gH_{2g+1}$ (wherein g represents an integer of from 12 to 60), eicosyl, and docosanyl. Preferable examples of the group represented by $R^3$ further include dodecyl, myristyl, cetyl, stearyl, oleyl, eicosyl, docosasyl, triacontasyl, tetracontasyl, heptacontasyl, dinonylphenyl, didodecylphenyl, tetradecylphenyl, tripentylphenyl, and dodecylnaphthyl. D represents a polyoxyalkylene group represented by Formula: $(B)_n$-E. Here, B represents —$CH_2CH_2O$—, —$CH_2CH_2CH_2O$—, —$CH(CH_3)CH_2O$—, or —$CH_2CH(OH)CH_2O$—, and n represents an integer of from 1 to 50. B preferably represents —$CH_2CH_2O$— and n preferably represents an integer of from 5 to 30. E represents hydrogen, or a substituted or unsubstituted alkyl group, aryl group, alkylcarbonyl group, or arylcarbonyl group, each of which has from 1 to 8 carbon atoms. The alkyl group is preferably methyl, ethyl, propyl, butyl, hexyl, or cyclohexyl, and particularly preferably methyl, ethyl or propyl. The alkylcarbonyl group is preferably acetyl, propionyl, butyroyl, pivaloyl, or cyclohexanecarbonyl, and particularly preferably acetyl. Examples of the aryl group include a phenyl group, and examples of the arylcarbonyl group include a benzoyl group. Particularly preferably, E represents hydrogen, methyl, ethyl, propyl, acetyl, propionyl, or benzoyl.

G represents a single bond or a linking group having a valency of from 2 to 7, preferably from 2 to 5, more preferably from 2 to 4, and even more preferably 2 or 3. G preferably represents an alkylene group, an arylene group, or a composite group thereof. G may be a divalent, substituted or unsubstituted, linking group that is interposed with a hetero atom such as an oxygen, an ester group, a sulfur atom, an amido group, a sulfonyl group, or a sulfur atom, preferably, an oxygen atom, an ester group, or an amido group. a and d each independently represent an integer of from 1 to 6. It should be noted that the dispersion stabilizer represented by Formula (1) preferably has a low solubility in an aqueous system from the viewpoint of emulsion stabilization. For example, the solubility of the dispersion stabilizer represented by Formula (1) in water is preferably 0.5% by mass or less (at 25° C.) and more preferably 0.1% by mass or less. Specific examples of the compound represented by Formula (1) include the compounds shown below. However, it should be construed that the invention is not limited to these specific examples.

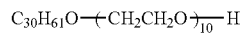
WA-1

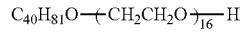
WA-2

WA-3

WA-4

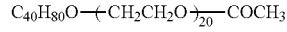
WA-5

WA-6

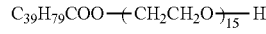
WA-7

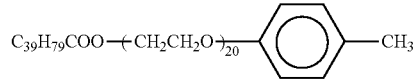
WA-8

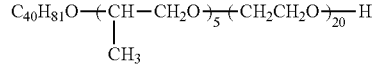
WA-9

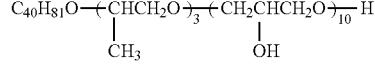
WA-10

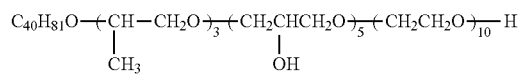
WA-11

WA-12

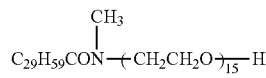
WA-13

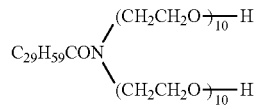
WA-14

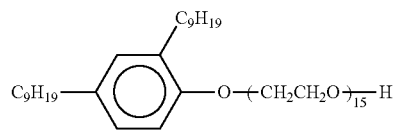
WA-15

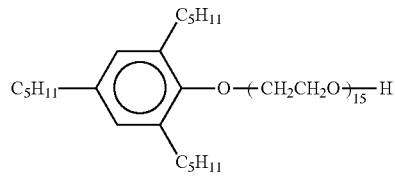
WA-16

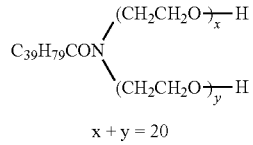
WA-17 x + y = 20

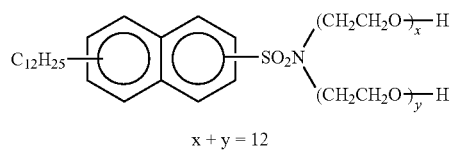
WA-18 x + y = 12

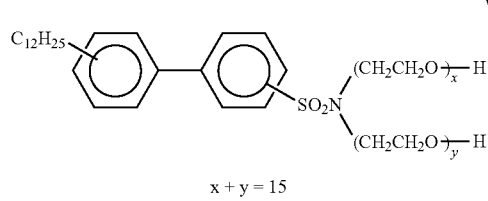
WA-19 x + y = 15

The content of the dispersion stabilizer in the ink composition is preferably from 0.1% by mass to 2% by mass, from the viewpoint of the dispersion stability of the ink composition, particularly, from the viewpoint of the dispersion stability of the wax.

Surfactant

The ink composition in the present invention preferably contains at least one surfactant. The surfactant may be used as a surface tension controller. Examples of the surface tension controller include a nonionic surfactant, a cationic surfactant, an anionic surfactant, and a betaine surfactant.

In order to eject the ink composition satisfactorily by an inkjet method, the content of the surfactant is preferably an amount that can adjust the surface tension of the ink composition to the range of from 20 mN/m to 60 mN/m. The content of the surfactant is more preferably an amount that can adjust the surface tension of the ink composition to the range of from 20 mN/m to 45 mN/m, and even more preferably an amount that can adjust the surface tension of the ink composition to the range of from 25 mN/m to 40 mN/m.

The surface tension of the ink composition is measured by a plate method using an automatic surface tensiometer CBVP-Z (trade name, manufactured by Kyowa Interface Science Co., Ltd.) under the condition of 25° C.

Examples of the surfactant which may be used include compounds described as surfactants in JP-A No. 59-157636, pages (37) and (38), and Research Disclosure No. 308119 (1989).

Further, fluorocarbon (fluoroalkyl) surfactants, silicone surfactants, and the like, such as those described in JP-A Nos. 2003-322926, 2004-325707, and 2004-309806 may be used to improve abrasion resistance.

The surface tension controller can also be used as an antifoaming agent, and a fluorine-containing compound, a silicone compound, a chelating agent represented by EDTA (ethylenediaminetetraacetic acid), or the like may be used.

Water

The ink composition of the present invention preferably contains water. There is no particular limitation as to the content of water. In the present invention, the content of water is preferably from 10% by mass to 99% by mass, more preferably from 30% by mass to 80% by mass, and even more preferably from 50% by mass to 70% by mass.

Additional Component

In addition to the components described above, the ink composition in the invention may further include one or more additional additives, as necessary.

Examples of additional additives in the invention include known additives such as an anti-fading agent, an emulsion stabilizer, a penetration enhancing agent, a UV absorber, an antiseptic agent, an antimildew agent, a pH adjuster, a surface-tension controller, an antifoaming agent, a viscosity adjuster, a dispersant, a dispersion stabilizer, an antirust agent and a chelating agent. These additives may be directly added to the ink composition after the preparation of the ink composition, or may be added during the preparation of the ink composition. Specific examples of the additives include the additives that are described as other additives in paragraphs [0153] to [0162] of JP-A No. 2007-100071, which are incorporated herein by reference.

Examples of the surface-tension controller include non-ionic surfactants, cationic surfactants, anionic surfactants, and betaine surfactants.

The amount of surface-tension controller to be added is preferably such that the surface tension of the ink composition is adjusted to be from 20 mN/m to 60 mN/m, more preferably from 20 mN/m to 45 mN/m, and further preferably from 25 mN/m to 40 mN/m, in order to enable favorable ink spotting by an inkjet method. The amount of surface tension controller to be added is preferably such that the surface tension of the ink composition is adjusted to be from 20 mN/m to 60 mN/m, more preferably from 30 mN/m to 50 mN/m, if the application of the ink is performed by a method other than inkjet.

In the invention, the surface tension of the ink composition is measured by a plate method at 25° C.

Specific examples of surfactants include, compounds described as surfactants in JP-A No. 59-157636, pp. 37 to 38 and Research Disclosure No. 308119 (1989) are also applicable. Fluoro(fluoroalkyl) surfactants, silicone surfactants or the like, such as those described in JP-A No. 2003-322926, 2004-325707 and 2004-309806, may be used to improve the anti-abrasion properties. The aforementioned surface-tension controller may be used also as an antifoaming agent, and fluorine-containing compounds, silicone compounds, chelate compounds such as EDTA may be used.

When the application of the ink is performed by an inkjet method, the viscosity of the ink composition of the invention is preferably from 4.5 mPa·s to 6.5 mPa·s, more preferably from 5 mPa·s to 6 mPa·s, from the viewpoints of ejection stability and coagulation speed.

When the application of the ink composition is performed by a method other than inkjet, the viscosity of the ink composition is preferably from 1 mPa·s to 40 mPa·s, and more preferably from 5 mPa·s to 20 mPa·s.

Here, the viscosity of the ink composition is a value obtained by a measurement using an E-type viscometer (manufactured by TOKI SANGYO CO., LTD.) at 25° C.

<<Image Forming Method>>

The image forming method of the invention includes image formation process in which an image is formed by ejecting an ink composition using a single pass method. Further, the image forming method of the invention preferably includes: before the image formation process, a treatment liquid application process of applying the treatment liquid, which is capable of aggregating the components of the ink composition, onto a recording medium.

The image forming method may further include one or more other processes, as necessary.

In the following, the respective steps of the image forming method of the invention are described.

—Ink Application Process (Image formation process)—

In the ink application process (image formation process), the ink composition of the invention described above is applied to a recording medium by an inkjet method (single pass method). The single pass method is described below.

In this process, the ink composition can be applied selectively onto a recording medium, whereby a desired visual image can be formed. The details of the ink composition of the invention, such as the details of the components of the ink composition and preferable embodiments, are as described above.

Specifically, image formation employing an inkjet method may be performed by ejecting the treatment liquid onto a desired recording medium by application of energy, and the recording medium is, for example, a plain paper or a resin-coated paper, such as paper exclusively for inkjet recording, a film, paper that can be used both for inkjet recording and electrophotographic recording, cloth, glass, a metal, or ceramic, and examples thereof include those described in JP-A Nos. 8-169172, 8-27693, 2-276670, 7-276789, 9-323475, 62-238783, 10-153989, 10-217473, 10-235995, 10-337947, 10-217597, and 10-337947. The method described in paragraphs [0093] to [0105] of JP-A No. 2003-306623 may be used as a preferred method in the invention.

The inkjet method is not particularly limited, and may be any known method such as a charge-control method in which ink is ejected by electrostatic attraction force; a drop-on-demand method (pressure-pulse method) in which a pressure of oscillation of a piezo element is utilized; an acoustic inkjet method in which ink is ejected by radiation pressure generated by irradiation of ink with acoustic beams that have been converted from electric signals; and a thermal inkjet method in which ink is ejected by a pressure generated by formation of bubbles caused by heating of ink (BUBBLEJET, registered trademark).

Further, examples of the inkjet method include a method in which a large number of small-volume droplets of an ink having a low optical density, which is called a photo ink, are ejected; a method in which inks having substantially the same hue but at different densities are used to improve image quality; and a method in which a clear and colorless ink is used.

The inkjet head used in an inkjet method may be either an on-demand type head or a continuous type head. Examples of ejection systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark-jet system), and any of these ejection systems is applicable.

The ink nozzles and the like used for the inkjet recording are not particularly limited, and may be selected as appropriate according to applications.

Regarding the inkjet head, there are (i) a shuttle system in which recording is performed while a short serial head is moved in the width direction of a recording medium in a scanning manner, and (ii) a line (single pass) system in which a line (single pass) head having recording devices that are aligned to correspond to the entire length of one side of a recording medium is used.

In the image forming method of the invention, the ink composition is applied onto a recording medium by a single pass system (single pass method) using a single pass head.

In the line system, image recording can be performed over the whole of one surface of a recording medium by moving the recording medium in a direction orthogonal to the direction along which the recording devices are aligned, and a conveyance system, such as carriage, which moves the short head in a scanning manner is unnecessary. Since a complicated scan-movement control of the movement of the carriage and the recording medium is unnecessary and only the recording medium is moved, the recording speed can be increased compared to the shuttle system.

When the ink composition of the invention is applied in the image forming method of the invention, occurrence of press blocking may be suppressed, and, further, the ejection accuracy can be improved and suppression of erosion caused by contact of the nozzle plate and the ink may be large when the image forming method of the invention is applied to a single pass system, in which dummy ejection is generally not performed.

In an embodiment, only one type of ink composition is used when recording is performed by the line system in the image formation process in the invention. In another embodiment, two or more types of ink composition are used when recording is performed by the line system in the image formation process, in such a manner that the interval between the ejection (ink spotting) of one ink composition (nth color (n>1), for example the second color), and the ejection (ink spotting) of the next ink composition ((n+1)th color, for example the third color) is 1 second or less, thereby realizing favorable recording. In the invention, when the interval between each ejection in the line system recording is set to 1 second or less, an image which has excellent abrasion resistance and in which occurrence of blocking is suppressed can be obtained at higher speeds than before, while preventing bleed and intermingling of colors caused by interference between ink droplets. The image obtained may also have excellent hue and excellent printing properties (such as reproducibility of thin lines and fine portions in the image).

The ink amount per droplet ejected from the inkjet head is preferably from 0.5 pl to 6 pl, more preferably from 1 pl to 5 pl, and still more preferably from 2 pl to 4 pl, from the viewpoint of obtaining a high resolution image.

—Treatment Liquid Application Process—

In the treatment liquid application process, the treatment liquid containing an aggregating agent capable of aggregating the component(s) in the ink composition is applied onto a recording medium.

In other words, the treatment liquid capable of causing formation of an aggregate is applied to a recording medium, thereby contacting the treatment liquid with the ink composition. When the treatment liquid contacts with the ink composition, dispersed particles, such as polymer particles and a colorant (for example, a pigment), in the ink composition aggregate, as a result of which an image is fixed to the recording medium. The details and preferable embodiments of the components of the treatment liquid are as described below.

<Treatment Liquid>

The treatment liquid in the invention is capable of causing aggregation when contacting with the ink composition described above. Specifically, the treatment liquid preferably includes an aggregating agent capable of causing formation of an aggregate by aggregating dispersed particles, such as colorant particles (pigment and the like), contained in the ink composition. The treatment liquid may further include other components, as necessary. Use of the treatment liquid with the ink composition realizes inkjet recording at higher speeds, and realizes formation of an image having high density, high resolution, and excellent print properties (such as reproduction of thin lines and fine areas) even at high recording speeds.

Aggregating Agent

The treatment liquid may include at least one aggregating agent capable of causing an aggregate when contacting with the ink composition. As a result of the treatment liquid mixing into the ink composition deposited by an inkjet method, aggregation of pigment and the like that have been stably dispersed in the ink composition is promoted.

The treatment liquid is, for example, a liquid that is capable of causing formation of an aggregate by changing the pH of the ink composition. In this case, the pH (at $25°$ C.$\pm 1°$ C.) of the treatment liquid is preferably from 1 to 6, more preferably from 1.2 to 5, and still more preferably from 1.5 to 4, from the viewpoint of the coagulation speed of the ink composition. In this case, the pH (at $25°$ C.$\pm 1°$ C.) of the ink composition to be ejected is preferably from 7.5 to 9.5, and more preferably from 8.0 to 9.0.

In the invention, it is preferable that the pH (at $25°$ C.$\pm 1°$ C.) of the ink composition is 7.5 or higher and that the pH of the treatment liquid (at $25°$ C.$\pm 1°$ C.) is from 1.5 to 3, from the viewpoints of image density, resolution, and inkjet recording at higher speeds.

The aggregating agent may be used singly, or two or more thereof may be used in mixture.

The treatment liquid may include at least one acidic compound as an aggregating component. Examples of acidic compounds that can be used include compounds having a phosphoric acid group, a phosphonic acid group, a phosphinic acid group, a sulfuric acid group, a sulfonic acid group, a sulfinic acid group, or a carboxyl group, and salts thereof (such as polyvalent metal salts thereof). From the viewpoint of coagulation speed of the ink composition, compounds having a phosphoric acid group or a carboxyl group are preferable, and compounds having a carboxyl group are more preferable.

The compounds having a carboxyl group are preferably selected from organic acids, examples thereof including polyacrylic acid, acetic acid, glycolic acid, malonic acid, malic acid (preferably DL malic acid), maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, and nicotinic acid, derivatives of these compounds, and salts thereof (such as polyvalent metal salts thereof).

These compounds may be used singly, or in combination of two or more thereof.

The treatment liquid may include, as an aggregating agent, a polyvalent metal salt, a polyallylamine, or a polyallylamine derivative. Use of this treatment liquid improves high-speed aggregation properties. Examples of the polyvalent metal salt include: a salt of an alkaline earth metal, which belongs to Group 2 of the Periodic Table, such as magnesium or calcium; a salt of a transition metal belonging to Group 3 of the Periodic Table, such as lanthanum; a salt of a metal belonging to Group 13 of the Periodic Table, such as aluminum; and a salt of a lanthanide, such as neodymium. The salt of such a metal is preferably a carboxylic acid salt (such as a formate, acetate, or benzoate), a nitrate, a chloride, or a thiocyanate. In particular, the following salts are preferable: a calcium or magnesium salt of a carboxylic acid (such as formic acid, acetic acid, or benzoic acid); a calcium or magnesium salt of nitric acid; calcium chloride; magnesium chloride; and a calcium or magnesium salt of thiocyanic acid.

The content of metal salt in the treatment liquid is preferably from 1% by mass to 10% by mass, more preferably from 1.5% by mass to 7% by mass, and still more preferably from 2% by mass to 6% by mass, form the viewpoint of aggregation effects.

The treatment liquid may include at least one cationic organic compound as an aggregating agent. Examples of the cationic organic compound include cationic polymers such as a poly(vinylpyridine) salt, poly(alkylaminoethyl acrylate), poly(alkylaminoethyl methacrylate), poly(vinylimidazol), polyethyleneimine, polybiguanide, polyguanide, and polyallylamine, and derivatives thereof.

The content of cationic organic compound in the treatment liquid is preferably from 1% by mass to 50% by mass, and more preferably from 2% by mass to 30% by mass, from the viewpoint of aggregation effects.

Among them, a di- or higher-valent organic acid or a di- or higher-valent organic compound is preferable as an aggregating agent, from the viewpoints of aggregation properties and abrasion resistance of an image.

The viscosity of the treatment liquid is preferably in the range of from 1 mPa·s to 30 mPa·s, more preferably from 1 mPa·s to 20 mPa·s, and still more preferably from 2 mPa·s to 15 mPa·s, and particularly preferably from 2 mPa·s to 10 mPa·s, from the viewpoint of the coagulation speed of the ink composition. Here, the viscosity is measured using a VISCOMETER TV-22 (trade name, manufactured by TOKI SANGYO CO. LTD) at 20° C.

The surface tension of the treatment liquid is preferably from 20 mN/m to 60 mN/m, more preferably from 20 mN/m to 45 mN/m, and still more preferably from 25 mN/m to 40 mN/m, from the viewpoint of the coagulation speed of the ink composition. Here, the surface tension is measured using an automatic surface tensiometer CBVP-Z (trade name, manufactured by Kyowa Interface Science Co., Ltd.) at 25° C.

Water-Soluble Organic Solvent

The treatment liquid includes an aggregating agent (preferably an organic acid), and the treatment liquid preferably includes water and a water-soluble organic solvent in addition to an aggregating agent. The specifics of the water-soluble organic solvent are the same as the specifics of the above-described hydrophilic organic solvent in the ink composition.

Additional Components

The treatment liquid may further include other various additives, as long as the effects of the invention are not impaired.

Examples of such additional additives include a known additive such as an anti-drying agent (humectant), an anti-fading agent, an emulsion stabilizer, a penetration enhancing agent, a UV absorber, an antiseptic agent, an antimildew agent, a pH adjuster, a surface tension controller, an antifoaming agent, a viscosity adjuster, a dispersant, a dispersion stabilizer, an antirust agent, or a chelating agent. The additives described as specific examples of additional additives contained in the ink composition in the above description may be used as additional additives in the treatment liquid.

The application of the treatment liquid can be performed employing a known method such as a coating method, an inkjet method, or a dip method. The coating method may be a known coating method such as a method using a bar coater, an extrusion die coater, an air doctor coater, a blade coater, a rod coater, a knife coater, a squeeze coater, a reverse roll coater, or the like. The specifics of the inkjet method are as described above.

The treatment liquid application process may be conducted either before or after the image formation process in which the ink composition is used.

In the invention, it is preferable that the image formation process is conducted after the application of the treatment liquid performed in the treatment liquid application process. That is, it is preferable that the treatment liquid for aggregating a colorant (preferably a pigment) in the ink composition is applied onto the recording medium in advance of the application of the ink composition, and that the ink composition is applied so as to contact with the treatment liquid that has been applied onto the recording medium, thereby forming an image. Inkjet recording at higher speeds can be realized thereby, and an image having high density and high resolution can be obtained even when high-speed recording is performed.

The amount of the treatment liquid to be applied is not particularly limited as long as the treatment liquid is capable of coagulating the ink composition. The amount of the treatment liquid to be applied is preferably such an amount as to adjust the amount of aggregating component (such as a di- or higher-valent carboxylic acid or a cationic organic compound) applied to 0.1 g/m$^2$ or higher. The amount of the treatment liquid is more preferably such that the amount of the aggregating component applied is adjusted to be from 0.1 to 1.0 g/m$^2$, still more preferably such that the amount of the aggregating component applied is adjusted to be from 0.2 to 0.8 g/m$^2$. When the amount of the aggregating component applied is 0.1 g/m$^2$ or more, the aggregation reaction proceeds favorably. When the amount of the aggregating component applied is 1.0 g/m$^2$ or less, gloss is not excessively high; the prevention of excessive increase of gloss is preferable.

In the invention, it is preferable that the image formation process is conducted after the treatment liquid application process, and that a heat-drying process of drying the treatment liquid on the recording medium by heating is further conducted during a period from after the application of the treatment liquid onto the recording medium to the application of the ink composition. Drying of the treatment liquid by heating performed in advance of the image formation process realizes favorable ink application properties such as bleed prevention, and realizes recording of a visible image having excellent color density and excellent hue.

The drying by heating may be conducted by using a known heating device such as a heater, a blowing device such as a dryer, or a combination thereof. The heating may be performed according to, for example, a method of applying heat, by using a heater or the like, from a side of the recording medium opposite to the surface applied with the treatment liquid, a method of blowing warm or hot air to the surface of the recording medium applied with the treatment liquid, or a method of heating by using an infrared heater. Alternatively, two or more of these methods may be combined and used for the heating.

—Thermal Fixing Process—

The image forming method of the invention preferably includes, after the image formation process, a thermal fixing process of thermally fixing an ink image formed by the application of the ink composition by bringing the ink image into contact with a heating surface. The image on the recording medium is fixed through the thermal fixing process, and thus the abrasion resistance of the image is further improved.

The heating for the thermal fixing is preferably conducted at a temperature that is equal to or higher than the minimum film-formation temperature (MFT) of the polymer particles in the image. Heating to the MFT or higher temperature forms the polymer particles into a film, thereby strengthening the image. The heating temperature is preferably a temperature range that is no lower than the MFT. Specifically, the heating temperature is preferably in the range of from 40° C. to 80° C., more preferably from 50° C. to 75° C., and still more preferably from 55° C. to 70° C.

The minimum film-formation temperature (MFT) of the polymer particles is controlled by the Tg of the polymer, and the type and amount of the ink solvent. There is a general tendency for the MFT to be decreased by any of a decrease in the Tg, a decrease in the I/O value of the ink solvent, or an increase in the amount of the ink solvent.

If a pressure is applied while heating, the pressure is preferably in the range of from 0.1 MPa to 3.0 MPa, more preferably from 0.1 MPa to 1.0 MPa, and still more preferably from 0.1 MPa to 0.5 MPa, from the viewpoint of smoothing the surface.

The method of heating is not particularly limited, and preferable examples thereof include a noncontact drying method, such as a method of heating with a heat generator such as a NICHROME wire heater, a method of supplying warm or hot air, or a method of heating with a halogen lamp, an infrared lamp, or the like. The method of applying a heat and a pressure is not particularly limited, and preferable examples thereof include a contact thermal fixing method, such as a method of pressing a hot plate against an image-formed surface of the recording medium, a method in which a heat-pressurization apparatus is used to pass the recording medium through a pressure contact portion, wherein the heat-pressurization apparatus may have a pair of heat-pressurization rollers or a pair of heat-pressurization belts, or may have a heat-pressurization belt disposed at the image-recorded surface of the recording medium and a support roller disposed at the opposite side of the recording medium. The pressure contact portion is thus formed between the pair of rollers or between the pair of heat-pressurization belts or between the heat-pressurization belt and the support roller.

When applying a heat and a pressure, the nip time is preferably from 1 msec to 10 sec, more preferably from 2 msec to 1 sec, and still more preferably from 4 msec to 100 msec. The nip width is preferably from 0.1 mm to 100 mm, more preferably from 0.5 mm to 50 mm, and still more preferably from 1 mm to 10 mm.

The heat-pressurization roller may be a metal roller made of metal, or a roller having a metal core of which outer surface is covered with a coating layer made of an elastic material and, optionally, a surface layer (also referred to as a release layer). The metal core may be, for example, a cylindrical body made of iron, aluminum, or SUS (stainless steel). It is preferable that at least a part of the surface of the metal core is coated with a coating layer. The coating layer is preferably formed by a silicone resin or fluororesin, each of which has release properties. It is preferable that a heat generator is built into the interior of the metal core of one of the heat-pressurization rollers. A heat treatment and a pressurization treatment may be performed simultaneously by passing the recording medium between the rollers. In an embodiment, the recording medium is heated by being nipped between two heating rollers, if necessary. Preferable examples of the heat generator include a halogen lamp heater, a ceramic heater, and a NICHROME wire.

The belt substrate of a heat-pressurization belt used in a heat-pressurization apparatus is preferably a seamless nickel electric brass, and the thickness of the substrate is preferably from 10 μm to 100 μm. Examples of the material of the belt substrate include aluminum, iron and polyethylene, in addition to nickel. When a silicone resin or a fluororesin is applied, the thickness of the layer formed by the resin is preferably from 1 μm to 50 μm, and more preferably from 10 μm to 30 μm.

In order to obtain a pressure (nip pressure) within the above range, elastic members that exhibit tension, such as a spring, may be selected and disposed at both ends of the roller (for example, a heat-pressurization roller), such that a desired nip pressure is obtained in consideration of the nip gap.

The conveyance speed of the recording medium when using a heat-pressurization roller or a heat-pressurization belt is preferably from 200 mm/sec to 700 mm/sec, more preferably from 300 mm/sec to 650 mm/sec, and still more preferably from 400 mm/sec to 600 mm/sec.

In a preferable embodiment, the image forming method of the present invention includes a removal process of removing ink adhered to the inkjet head which performs the ejecting by a single pass method.

By performing the removal process, namely, by removing the ink composition, sticking substances originating from the ink composition, or other adhered substances, which have been adhered to the inkjet head, the ink ejection performance just after the ejection and after a period of time from the ejection may be further improved, which is preferable.

—Recording Medium—

According to the image forming method of the invention, an image is recorded on a recording medium.

The recording medium is not particularly limited, and may be a cellulose-based general printing paper, such as high-quality paper, coat paper, or art paper, that is used for general offset printing and the like. When image recording is performed on the cellulose-based general printing paper by a general inkjet method using an aqueous ink, absorption and drying of the ink is relatively slow, colorant migration easily occurs after ink spotting, and image quality tends to lower. In contrast, according to the image forming method of the invention, recording of a high-quality image having excellent color density and excellent hue is achieved while suppressing the migration of the colorant.

The recording medium may be a commercially-available product, and examples thereof include high-quality papers (A) such as PRINCE WOOD FREE (trade name) manufactured by Oji Paper Co., Ltd., SHIORAI (trade name) manufactured by Nippon Paper Industries Co., Ltd., and New NPI jo-shitsu (New NPI high-quality; trade name) manufactured by Nippon Paper Industries Co., Ltd.; very light-weight coated papers such as EVER LIGHT COATED (tradename) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd. As the recording medium, various inkjet-recording papers exclusively for photos may be used.

Among them, a recording medium having a water absorption coefficient Ka of from 0.05 $mL/m^2 \cdot ms^{1/2}$ to 0.5 $mL/m^2 \cdot ms^{1/2}$ is preferable, a recording medium having a water absorption coefficient Ka of from 0.1 $mL/m^2 \cdot ms^{1/2}$ to 0.4 $mL/m^2 \cdot ms^{1/2}$ is more preferable, and a recording medium having a water absorption coefficient Ka of from 0.2 mL/m²·ms^(1/2) to 0.3 mL/m²·ms^(1/2) is still more preferable, from the viewpoints of obtaining large effects in suppression of colorant migration and obtaining a high-quality image having more favorable color density and hue than before.

The water absorption coefficient Ka has the same definition as that described in JAPAN TAPPPI Pulp and Paper Testing Method No. 51: 2000 (published by JAPAN TAPPI), the disclosure of which is incorporated by reference herein. Specifically, the water absorption coefficient Ka is calculated from a difference in water transfer amount between a contact time of 100 ms and a contact time of 900 ms that are measured using an automatic scanning liquid absorptometer KM500win (manufactured by KUMAGAI RIKI KOGYO CO., LTD.).

Among the recording media, coated paper, which is used for general offset printing, is preferable. The coated paper is produced generally by coating a surface of cellulose-based paper (such as high-quality paper or neutral paper) that has not been subjected to surface treatment, with a coating material so as to form a coating layer. When image forming is performed by usual aqueous inkjet, the coated paper tends to produce problems in quality, for example in image gloss or abrasion resistance. However, unevenness in gloss is suppressed and an image having excellent gloss and excellent abrasion resistance can be obtained according to the image forming method of the invention even when the coated paper is used. In particular, it is preferable to use a coated paper having base paper and a coated layer including kaolin and/or calcium bicarbonate. Specifically, art paper, coat paper, light-weight coat paper, or very light-weight coat paper is preferable.

The recorded material obtained by recording on a recording medium by the image forming method of the invention may have high resolution, high abrasion resistance, and excellent blocking resistance even when recorded at high speeds.

EXAMPLES

The present invention is described in further detail below by reference to examples. However, the examples should not be construed as limiting the scope of the invention. Hereinafter, "part(s)" and "%" are based on mass, unless otherwise specified.

In the following, weight average molecular weights were measured using a gel permeation chromatography (GPC). The GPC was performed using three columns of TSKGEL GMHxL, TSKGEL G4000HxL, and TSKGEL G2000HxL (trade names, all manufactured by Tosoh Corporation), and THF (tetrahydrofuran) as an eluent. Regarding the GPC conditions, the sample concentration was 0.35% by mass, the flow rate was 0.35 ml/min, the sample injection amount was 10 μl, and the measurement temperature is 40° C. The detection was performed by using a refractive index detector. The calibration curve was determined from the following eight standard samples: TSK STANDARD POLYSTYRENEs of F-40, F-20, F-4, F-1, A-5000, A-2500, A-1000, and n-propylbenzene, all manufactured by Tosoh Corporation.

(Synthesis of Polymer Dispersant P-1)

Polymer dispersant P-1 was synthesized in a manner as described below according to the following scheme.

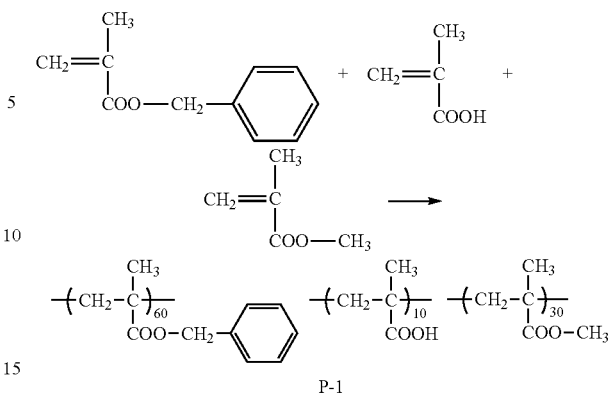

88 g of methyl ethyl ketone was placed in a 1000 mL three-necked flask equipped with an agitator and a condenser tube, and was heated to 72° C. under a nitrogen atmosphere. Then, a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added thereto dropwise over 3 hours. After the addition was completed, the mixture was further allowed to react for one hour, and then a solution obtained by dissolving 0.42 g of dimethyl 2,2'-azobisisobutyrate in 2 g of methyl ethyl ketone was added. The temperature of the resulting mixture was elevated to 78° C., and the mixture was heated for 4 hours. The obtained reaction liquid was reprecipitated twice with an excess of hexane. The separated resin was dried, to obtain 96 g of polymer dispersant P-1.

The composition of the obtained resin was confirmed by ¹H-NMR, and the weight average molecular weight (Mw) determined by GPC was 44,600. Further, the acid value of the resin was 65.2 mgKOH/g as determined by the method described in JIS (JISK 0070: 1992).

(Preparation of Pigment Dispersion C)

10 parts of Pigment Blue 15:3 (trade name: PHTHALO-CYANINE BLUE A220, manufactured by Dainichiseika Color & Chemicals Mfg. Co., Ltd.), 5 parts of the polymer dispersant P-1 obtained as described above, 42 parts of methyl ethyl ketone, 5.5 parts of a 1 N aqueous solution of NaOH (sodium hydroxide), and 87.2 parts of ion exchanged water were mixed, and dispersed for 2 hours to 6 hours using a bead mill with zirconia beads having a diameter of 0.1 mm.

From the resulting dispersion, methyl ethyl ketone was removed under a reduced pressure at 55° C., and further a part of water was removed. Subsequently, centrifugation processing was performed for 30 minutes at 8,000 rpm using HIGH SPEED REFRIGERATED CENTRIFUGE 7550 (trade name, manufactured by Kubota Corp.) and using a 50 mL centrifuge tube, to recover the supernatant other than the precipitate. Thereafter, the pigment concentration was determined from an absorbance spectrum. In this way, pigment dispersion C (cyan dispersion liquid C) of resin-coated pigment particles (pigment coated with the polymer dispersant) which had a pigment concentration of 10.2% by mass was obtained.

(Preparation of Pigment Dispersion M)

Preparation of Pigment Dispersion M (Magenta Dispersion Liquid M) as a Dispersion of resin-coated pigment particles (pigment coated with the polymer dispersant) was conducted in a manner substantially similar to that in the preparation of the pigment dispersion C, except that Pigment Red 122 was used instead of using Pigment Blue 15:3 (trade name: PHTHALOCYANINE BLUE A220, manufactured by Dainichiseika Color & Chemicals Mfg. Co., Ltd.) in the preparation of the pigment dispersion C.

(Preparation of Pigment Dispersion Y)

Preparation of Pigment Dispersion Y (Yellow Dispersion Liquid Y) was Conducted in a manner substantially similar to that in the preparation of the pigment dispersion C, except that a yellow pigment, Pigment Yellow 74, was used instead of using the cyan pigment, Pigment Blue 15:3, in the preparation of the pigment dispersion C, and the addition amount of the polymer dispersant was changed to 4.0 g according to solid content conversion. The average particle diameter of the pigment particles in the obtained yellow dispersion liquid Y was 82 nm.

(Preparation of Pigment Dispersion K)

Preparation of Pigment Dispersion K (Black Dispersion Liquid K) was Conducted in a manner substantially similar to that in the preparation of the pigment dispersion C, except that carbon black (trade name: NIPEX 160-IQ, manufactured by Degussa) was used instead of using the cyan pigment, Pigment Blue 15:3, in the preparation of the pigment dispersion C (cyan dispersion liquid C), and the addition amount of the polymer dispersant was changed to 3.0 g according to solid content conversion. The average particle diameter of the pigment particles in the obtained black dispersion liquid K was 130 nm.

[Preparation of Water-Insoluble Polymer Particles]

—Water-insoluble Polymer Particles A—

Methyl ethyl ketone (560.0 g) was placed in a 2 L three-necked flask equipped with a stirrer, a thermometer, a reflux condenser tube, and a nitrogen gas introducing tube, and the temperature was increased to 87° C. While a reflux state was maintained inside the reaction vessel (the reflux was maintained until the end of reaction), a mixed solution including 220.4 g of methyl methacrylate, 301.6 g of isobornyl methacrylate, 58.0 g of methacrylic acid, 108 g of methyl ethyl ketone, and 2.32 g of "V-601" (trade name, manufactured by Wako Pure Chemical Industries, Ltd.) was added dropwise at a constant speed over two hours (sucn that the dropwise addition completed in two hours). After completion of the dropwise addition, stirring was performed for one hour, then (1) a solution formed of 1.16 g of "V-601" and 6.4 g of methyl ethyl ketone was added thereto and the mixture was stirred for two hours, and, the process (1) was repeated four times, and, moreover, a solution formed of 1.16 g of "V-601" and 6.4 g of methyl ethyl ketone was added thereto, and, the resultant was stirred for three hours. After completion of polymerization reaction, the temperature of the solution was decreased to 65° C., 163.0 g of isopropanol was added thereto and then, the mixture was allowed to cool. The weight average molecular weight (Mw) of the obtained copolymer was 63,000, and the acid value was 65.1 (mgKOH/g).

Next, 317.3 g (solid concentration of 41.0%) of the obtained polymer solution was weighed, 46.4 g of isopropanol, 1.65 g of a 20% maleic acid anhydride aqueous solution (a water-soluble acidic compound, corresponding to maleic acid of 0.3% with respect to the copolymer), and 40.77 g of a 2 mol/L sodium hydroxide aqueous solution were added thereto, and the temperature in the reaction vessel was raised to 70° C. Next, 380 g of distilled water was added dropwise at a speed of 10 mL/min so as to disperse the resultant in water (dispersing process).

Thereafter, under reduced pressure, the inside of the reaction vessel was maintained at a temperature of 70° C. for 1.5 hours so as to distil off the isopropanol and the methyl ethyl ketone and distilled water in total amount of 287.0 g (solvent removal process).

Thereafter, the filtration was performed using a filter of 1 μm, a filtered liquid was recovered, and an aqueous dispersion of the water-insoluble polymer particles A of solid concentration 26.5% was obtained.

—Water-Insoluble Polymer Particles B and C—

Each of water-soluble polymer particles B and water-soluble polymer particles C was prepared substantially in the same manner as in the preparation of water-soluble polymer particles A except that the kind of monomers and the composition were changed.

Example 1

<Preparation of Treatment Liquid 1>

Treatment liquid 1 was prepared by mixing and dissolving the respective components described below to give the following composition.

(Composition of Treatment Liquid 1)

| | |
|---|---|
| Malonic acid | 11.25% by mass |
| DL-malic acid | 14.5% by mass |
| Diethylene glycol monobutyl ether | 4.0% by mass |
| Tripropylene glycol monomethyl ether (trade name: MFTG) | 4.0% by mass |
| Ion exchanged water | 66.25% by mass |

The pH of the treatment liquid 1 obtained by measurement using a pH meter WM-50EG (trade name, manufactured by DKK-TOA Corporation) was 1.10. Further, the surface tension of the treatment liquid 1 obtained by measurement using FASE AUTOMATIC SURFACE TENSIOMETER CBVP-Z (trade name, manufactured by Kyowa Interface Science Co., Ltd.) was 41.3 mN/m.

<Preparation of Ink Composition>

(Preparation of Ink Composition M1)

Sample M1 was prepared by mixing the respective components described below to give the following composition, using the above pigment dispersion M and the above water-based dispersion of self-dispersing polymer particles (B-01). The prepared Sample M1 was placed in a disposable syringe made of a plastic, and was filtrated with PVDF (polyvinylidene difluoride) 5 μm filter (trade name: MILLEX SV, manufactured by Millipore Corporation; diameter of 25 mm) to obtain a finished ink composition.

(Composition of Sample M1)

| | |
|---|---|
| Pigment dispersion M (pigment concentration of 15% by mass) | 33.3 g |
| SANNIX GP-250 (trade name, manufactured by Sanyo Chemical Industries, Ltd.) | 8.0 g |
| MFTG (trade name, manufactured by Nippon Nyukazai Co., Ltd.) | 8.0 g |
| Urea (manufactured by Nissan Chemical Industries, Ltd.) | 5.0 g |
| OLFINE E1010 (trade name, manufactured by Nissin Chemical Industry Co., Ltd.) | 1.0 g |
| Water-insoluble polymer particles | not added |
| Wax | not added |
| Ion exchanged water | up to the total amount of 100 g |

(Preparation of Ink Compositions M2 to M13)

Preparation of Samples M2 to M13 was conducted in a manner substantially similar to that in the preparation of Sample M1, except that the components, the amounts thereof, and the like were changed from those in the composition of Sample M1 in the preparation of Sample M1, as shown in Table 1. Further, preparation of ink compositions M2 to M13 was conducted in a manner substantially similar to that in the preparation of the ink composition M1.

<Image Recording>

Image recording was performed under the image recording conditions described below, using A4 size TOPKOTE (trade name, manufactured by Oji Paper Co., Ltd.; basis weight of 104.7 g/m$^2$) as the recording medium, and using the above treatment liquid and the ink composition in combination.

<Ejection Method>

A solid image was formed by ejecting each of the ink compositions of magenta pigment ink M (ink composition M1 to M13) obtained as described above in accordance with a single pass method.

—Treatment Liquid Application Process—

Just before image formation by application of the ink composition onto the recording medium, the treatment liquid was coated on the recording medium surface by the use of a coating bar so that the coating amount was 1.7 g/m$^2$.

Subsequently, the recording medium which had been applied with the treatment liquid was dried under the following conditions.

—Conditions for Drying of Treatment Liquid (Air Blow Drying)—

Air velocity: 15 m/s

Temperature: the recording medium was heated using a contact type plane heater, from the rear side of the recording medium surface to be recorded, so that the surface, temperature of the recording medium was 60° C.

Air blow region: 450 mm (drying time: 0.7 sec)

—Image Formation Process—

Thereafter, the ink composition was applied onto the recording medium, which had been applied with the treatment liquid, under the following conditions.

Head: piezo full line heads with 1,200 dpi/20 inch width were arranged for 4 colors.

Amount of ejected liquid droplets: 2.4 pL, to perform recording.

Driving frequency: 30 kHz (conveyance speed of recording medium: 635 mm/sec)

Subsequently, the recording medium which had been applied with the ink composition was dried under the following conditions.

—Conditions for Drying of Ink (Air Blow Drying)—

Air velocity: 15 m/s

Temperature: the recording medium was heated using a contact type plane heater, from the rear side of the recorded recording medium surface, so that the surface temperature of the recording medium was 60° C.

Air blow region: 640 mm (drying time: 1 sec)

Subsequently, thermal fixing treatment was carried out under the following conditions.

—Fixation—

Silicone rubber roller (hardness of 50°, and nip width of 5 mm)

Temperature of roller: 90° C.

Pressure: 0.8 MPa

<Evaluation>

1. Evaluation of Abrasion Resistance

A sheet of unprinted TOPKOTE (trade name, manufactured by Oji Paper Co., Ltd.; basis weight of 104.7 g/m$^2$) was placed on the image area, and was rubbed back and forth ten times with a load of 200 g and with the length of the stroke of 20 mm. The image area after rubbing was subjected to visual observation and evaluated into four grades.

—Evaluation Criteria—

AA: abrasion is not recognized at all.

A: abrasion marks are slightly recognized on the image surface.

B: marks which are made when a part of the image surface is slightly removed can be seen, that is the limit of usage.

C: a part of the image is removed, and a part of the color ink is removed, and thus, at least one noticeable abrasion mark remains such that a part of the paper surface can be seen.

2. Evaluation of Blocking Resistance (Just-after-Blocking)

The evaluation sample obtained as described above was cut into two sheets with a size of 3.5 cm×4 cm. The two sheets of the evaluation sample were placed on an acrylic plate having a size of 10 cm×10 cm such that the printed surfaces faced each other, and further, ten sheets of unprinted TOPKOTE (trade name, manufactured by Oji Paper Co., Ltd.; basis weight of 104.7 g/m$^2$), which had been cut into the same size, were placed in a layered manner on this evaluation sample. Then, another acrylic plate having a size of 10 cm×10 cm was further placed thereon, and the assembly was left to stand for 12 hours under an environment of 60° C. and 30% RH.

After standing still, a weight of 1 kg (corresponding to a load of 700 kg/m$^2$) was loaded on the top acrylic plate, and the assembly was further left to stand for 24 hours under the condition of 60° C. and 30% RH.

Furthermore, the assembly was stored for 2 hours under an environment of 25° C. and 53% RH. Thereafter, the printed surfaces of the evaluation sample were peeled off. The ease of peeling in this process, and the adhesion after peeling were visually observed. Evaluation was made according to the following evaluation criteria.

—Evaluation Criteria—

AA: adhesion is not recognized at all at the printed face.

A: adhesion is not visually recognized at the printed face, but by using a microscope of 50 magnifications, adhesion can be recognized and the paper surface can be seen.

B: adhesion is slightly visually recognized at the image surface of the printed face.

C: adhesion occurs at the printed face such that the images adhere to each other, and peeling of one of these images can be visually observed.

3. Evaluation of Press Blocking Resistance

Assuming that adhesion and transfer would occur between the printed images by the pressure applied at the time of the cutting processing of the printed matters, the samples obtained above were laid to overlap each other such that the printed surfaces faced each other, then load application for three conditions (application of load of 100 N for 10 seconds, application of load of 500 N for 10 second, and application of load of 1,000 N for 10 seconds) were separately performed, and then the printed images were peeled off. The degree of adhesion and transfer of ink at the printed face was visually observed, and evaluation was made according to the following criteria.

—Evaluation Criteria—

AA: adhesion is not seen at all at the printed face.

A: adhesion and transfer can be slightly recognized at the printed face.

B: adhesion and transfer can be observed at about several percent of the printed face area.

C: adhesion and transfer can be observed at 10% or more of the printed face area.

4. Evaluation of Ink Ejection Performance (Evaluation of Ejection Recoverability: Dummy Jet (DJ) Recoverability)

A printer head GELJET GX5000 (trade name, manufactured by Ricoh Co., Ltd.) was fixed such that the direction of the line head in which nozzles were arranged in a line was in the perpendicular direction with respect to the moving direction of the stage. Then, the storage tank connected to the printer head was refilled with the ink composition prepared as described above.

A sheet of "KASSAI SHASHIN SHIAGE PRO" (trade name, manufactured by Fujifilm Corporation) that served as a recording medium was fixed on the stage that was movable in the perpendicular direction with respect to the nozzle arrangement direction of the head.

Next, while moving the stage at a velocity of 211 mm/sec in the conveying direction, ink droplets were ejected at an ink droplet amount of 3.4 pL, at an ejection frequency of 10 kHz, and at a resolution (nozzle arrangement direction×conveying direction) of 75 dpi×1,200 dpi, such that 2,000 ink droplets per one nozzle were ejected to print 96 lines in a direction parallel to the conveying direction. It was confirmed that the ink was ejected from all of the nozzles.

After ejecting the ink, the head was left for a predetermined time (at intervals of 5 minutes, from 5 minutes to 45 minutes) in the state as it was. Then, another sheet of the recording medium was fixed on the stage, and the ink was ejected again under substantially the same conditions as those described above. When all the 96 nozzles were able to eject in the ejection of 2,000 ink droplets after leaving the head, the time period in which the head was left is referred to as a "leaving time" and evaluated in accordance with the following evaluation criteria. The leaving time was used as an index for evaluating ink ejection performance (DJ recoverability). It is thought that the ejection performance is better, as the leaving time is longer. Evaluation criteria were set as follows.

The above ejection recoverability test was carried out just after the preparation of ink compositions M1 to M13 and after the ink compositions were left for 14 days under an environment of 60° C. (after a period of time), to evaluate the ink ejection performance.

—Evaluation Criteria—
AA: 45 minutes or more
A: 30 minutes or more but less than 45 minutes
B: 20 minutes or more but less than 30 minutes
C: less than 20 minutes 5. Evaluation of Maintenance Properties In accordance with the conditions as described in the following (1) to (3), after the ink composition was ejected, the nozzle face of the inkjet head was wiped using a wiper blade (made of a hydrogenized form of NBR (nitrile butadiene rubber)), and thereafter, re-ejection properties evaluation was carried out. The re-ejection properties evaluation (acceptable or not) was carried out in accordance with the following (1) to (3). Then, the maintenance properties were evaluated according to the following evaluation criteria, based on the results of the re-ejection properties evaluation. The obtained results are shown in Table 1.

(1) Just after the completion of continuous ejection for 60 minutes, blade wiping is carried out once. Thereafter, the ink ejection ratio is obtained in accordance with the method as described below. In a case in which the ink ejection ratio is 90% or higher, the ink is judged to be acceptable.

(2) After ejection for 1 minute, the ejection is stopped for 30 minutes, and then blade wiping is carried out once. Thereafter, the ink ejection ratio is obtained in accordance with the method as described below. In a case in which the ink ejection ratio is 90% or higher, the ink is judged to be acceptable.

(3) Just after the completion of ejection for 10 minutes, blade wiping is carried out once. Thereafter, an image is formed. In a case in which no image unevenness is observed in the image, the ink is judged to be acceptable.

—Measuring Method of Ink Ejection Ratio—

At the time of the initiation of the experiment, it was confirmed that the ink was ejected from all of the nozzles. Then, after the completion of the experiment including the maintenance (i.e., after the blade wiping in the above (1) and (2)), the number of nozzles capable of ejecting was counted, and the ink ejection ratio was calculated according to the following equation.

Ink ejection ratio (%)=[number of nozzles capable of ejection after maintenance]/[total number of nozzles]×100(%)

—Evaluation Criteria—
AA: Acceptable in all of three items of (1) to (3).
A: Acceptable in two items.
B: Acceptable in only one item.
C: Unacceptable in all of three items.

TABLE 1

| | | Ink Composition No. | | | | | | | |
|---|---|---|---|---|---|---|---|---|---|
| | | M1 | M2 | M3 | M4 | M5 | M6 | M7 | M8 |
| Pigment Dispersion M (15%) | | 33.3 | 33.3 | 33.3 | 33.3 | 33.3 | 33.3 | 33.3 | 33.3 |
| Water-Soluble Organic Solvent | GP-250 | 8 | 8 | 8 | 8 | 8 | 8 | 8 | 8 |
| | MFTG | 8 | 8 | 8 | 8 | 8 | 8 | 8 | 8 |
| Solid Moistening Agent | Urea | 5 | 5 | — | 5 | 5 | — | — | 5 |
| | Ethylene Urea | — | — | — | — | — | 7.2 | 7.2 | — |
| Surfactant | OLFINE E1010 | 1 | 1 | 1 | 1 | 1 | 1 | 1 | 1 |
| Water-Insoluble Polymer Particles | Water-Insoluble Polymer Particle A Tg = 160° C. | — | 8 | 6 | 6 | 6 | 6 | 6 | 6 |
| | Water-Insoluble Polymer Particle B Tg = 86° C. | — | — | — | — | — | — | — | — |
| | Water-Insoluble Polymer Particle C Tg = 114° C. | — | — | — | — | — | — | — | — |
| Wax | SELOSOL 524 (Chukyo Yushi Co., Ltd.) mp = 83° C. | — | — | 7 | 2 | 2 | 2 | — | — |
| | TORASORU PF60 (Chukyo Yushi Co., Ltd.) mp = 66° C. | — | — | — | — | — | — | — | 2 |
| | POLYLON L-787 (Chukyo Yushi Co., Ltd.) mp = 102° C. | — | — | — | — | — | — | 2 | — |
| | Ester A mp = 31° C. | — | — | — | — | — | — | — | — |
| | CELLOSOL 686 (Chukyo Yushi Co., Ltd.) mp = 54° C. | — | — | — | — | — | — | — | — |
| Stabilizer | NEWCOL 1310 (Nippon Nyukazai Co., Ltd.) | — | — | — | — | 0.5 | — | 0.2 | — |
| | NEWCOL 1820 (Nippon Nyukazai Co., Ltd.) | — | — | — | — | — | — | — | 0.5 |
| | NEWCOL 3520 (Nippon Nyukazai Co., Ltd.) | — | — | — | — | — | — | — | — |

TABLE 1-continued

| Evaluation | | | | | | | | | |
|---|---|---|---|---|---|---|---|---|---|
| | Abrasion Resistance | C | B | AA | A | A | A | A | AA |
| | Blocking Resistance Just After Preparation | C | C | AA | AA | AA | A | B | AA |
| | Press Blocking Resistance | B | A | A | AA | AA | A | B | AA |
| | Ink Ejection Performance (Just-after-blocking) | A | A | C | AA | AA | AA | B | AA |
| | Ink Ejection Performance After Period of Time | B | B | C | A | AA | A | C | AA |
| | Maintenance Properties | A | A | C | AA | AA | A | B | AA |
| Note | | Comparative | Comparative | Comparative | Invention | Invention | Invention | Comparative | Invention |

(unit: g)

| | | Ink Composition No. | | | | | | | |
|---|---|---|---|---|---|---|---|---|---|
| | | M9 | M10 | M11 | M12 | M13 | M14 | M15 | M16 |
| Pigment Dispersion M (15%) | | 33.3 | 33.3 | 33.3 | 33.3 | 33.3 | 33.3 | 33.3 | 33.3 |
| Water-Soluble Organic Solvent | GP-250 | 8 | 8 | 8 | 8 | 8 | 8 | 8 | 8 |
| | MFTG | 8 | 8 | 8 | 8 | 8 | 8 | 8 | 8 |
| Solid Moistening Agent | Urea | — | 5 | 5 | 5 | 5 | 5 | 5 | 5 |
| | Ethylene Urea | 7.2 | — | — | — | — | — | — | — |
| Surfactant | OLFINE E1010 | 1 | 1 | 1 | 1 | 1 | 1 | 1 | 1 |
| Water-Insoluble Polymer Particle | Water-Insoluble Polymer Particle A Tg = 160° C. | — | 6 | 6 | 6 | 6 | — | — | — |
| | Water-Insoluble Polymer Particle B Tg = 86° C. | 6 | — | — | — | — | — | — | — |
| | Water-Insoluble Polymer Particle C Tg = 114° C. | — | — | — | — | — | 6 | 6 | 6 |
| Wax | SELOSOL 524 (Chukyo Yushi Co., Ltd.) mp = 83° C. | 2 | — | — | — | 2 | — | — | 2 |
| | TORASORU PF60 (Chukyo Yushi Co., Ltd.) mp = 66° C. | — | — | — | 2 | — | — | 2 | — |
| | POLYLON L-787 (Chukyo Yushi Co., Ltd.) mp = 102° C. | — | — | — | — | — | 2 | — | — |
| | Ester A mp = 31° C. | — | 2 | — | — | — | — | — | — |
| | CELLOSOL 686 (Chukyo Yushi Co., Ltd.) mp = 54° C. | — | — | 2 | — | — | — | — | — |
| Stabilizer | NEWCOL 1310 (Nippon Nyukazai Co., Ltd.) | — | — | — | — | — | — | — | — |
| | NEWCOL 1820 (Nippon Nyukazai Co., Ltd.) | — | — | 0.5 | — | 0.5 | 0.5 | — | 0.5 |
| | NEWCOL 3520 (Nippon Nyukazai Co., Ltd.) | — | — | — | 0.2 | — | — | 0.2 | — |
| Evaluation | Abrasion Resistance | C | A | A | AA | A | D | B | B |
| | Blocking Resistance (Just-after-blocking) | B | B | A | AA | AA | A | AA | A |
| | Press Blocking Resistance | B | B | A | AA | AA | A | AA | A |
| | Ink Ejection Performance Just After Preparation | A | B | AA | AA | AA | A | A | A |
| | Ink Ejection Performance After Period of Time | B | C | A | AA | AA | A | A | A |
| | Maintenance Properties | C | A | AA | AA | AA | A | AA | A |
| Note | | Comparative | Comparative | Invention | Invention | Invention | Comparative | Invention | Invention |

(unit: g)

Water-insoluble polymer particle A: MMA/IBOMA/MAA = 38/52/10 Tg = 160° C.
Water-insoluble polymer particle B: MMA/MeOEA/BzMA/MAA = 44/13/35/8 Tg = 86° C.
Water-insoluble polymer particle C: MMA/BzMA/MAA = 57/35/8 Tg = 114° C.
GP-250: SANNIX GP-250 (trade name, manufactured by Santo Chemical Industries, Ltd.)
MFTG: tripropylene glycol monomethyl ether (manufactured by Nippon Nyukazai Co., Ltd.)
Ester A: a substance obtained by dispersing $C_{17}H_{35}COOC_8H_{17}$ using anionic surfactant A.
Anionic surfactant A: N-oleoyl-N-methyltaurine sodium salt
Anionic Surfactant A

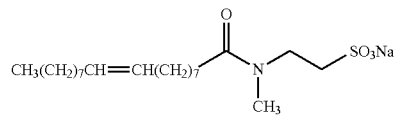

As is evident from the results shown in Table 1, the ink compositions of the present invention exhibited excellent abrasion resistance, excellent blocking resistance (just-after-blocking), and excellent press blocking resistance, as well as satisfactory ink ejection performance, that was also stable after leaving the ink composition for a period of time. Furthermore, the samples of the present invention exhibited excellent maintenance properties.

Example 2

Evaluation of performance of inks was performed using ink compositions Y1 to Y13, ink compositions C1 to C13, and ink compositions K1 to K13, which were prepared as described below, instead of using the ink compositions M1 to M13 in Example 1. As a result, with regard to the samples of the present invention, excellent results similar to the results in Example 1 were obtained.

(Preparation of Ink Compositions Y1 to Y13, C1 to C13, and K1 to K13)

Preparation of ink compositions Y1 to Y13, C1 to C13, and K1 to K13 of yellow, cyan, and black was conducted in a manner substantially similar to that in the preparation of the ink compositions M1 to M13, except that the pigment dispersion Y, C, or K described above was used instead of using the pigment dispersion M of the above Samples M1 to M13.

Example 3

Two color (C/M, Y/M, K/M, or Y/C) images were formed using the above ink compositions in combination. Then, with regard to the formed images, evaluation of abrasion resistance, blocking resistance (just-after-blocking), and press blocking resistance was performed. As a result, with regard to the combinations of the ink compositions of the present invention, excellent performance similar to that in Example 1 was obtained.

In the above two color image formation, for example, in the case of an image of an cyan ink and a magenta ink (C/M), first, a magenta solid image was formed, using the magenta ink, on the whole surface of the recording medium, and then a dot image of a cyan ink was formed on the formed magenta solid image, to prepare a two color image.

Exemplary embodiments of the invention include, but are not limited to, the following.

[1] An ink composition comprising:
a pigment that is coated with a water-insoluble resin;
particles of a water-insoluble polymer having a glass transition temperature of 100° C. or higher;
a solid moistening agent;
a water-soluble organic solvent;
particles of a wax having a melting point of from 40° C. to lower than 100° C.; and water.

[2] The ink composition of [1], wherein the water-insoluble polymer has a glass transition temperature of from 100° C. to 200° C.

[3] The ink composition of [1] or [2], wherein the wax is at least one selected from the group consisting of petroleum-derived waxes and vegetable-derived waxes.

[4] The ink composition of any one of [1] to [3], wherein the solid moistening agent is at least one selected from the group consisting of urea and urea derivatives.

[5] The ink composition of any one of [1] to [4], further comprising a dispersion stabilizer that comprises a compound represented by the following Formula (1):

  Formula (1)

wherein, in Formula (1), $R^3$ represents an alkyl group having from 10 to 60 carbon atoms, an alkenyl group having from 10 to 60 carbon atoms, an aralkyl group having from 10 to 60 carbon atoms, or an aryl group having from 10 to 60 carbon atoms; G represents a linking group having a valency of from 2 to 7; D represents (B)n-E, wherein B represents —CH$_2$CH$_2$O—, —CH$_2$CH$_2$CH$_2$O—, —CH(CH$_3$)CH$_2$O—, or —CH$_2$CH(OH)CH$_2$O—, n represents an integer of from 1 to 50, and E represents hydrogen, or an alkyl group having from 1 to 8 carbon atoms, an aryl group having from 1 to 8 carbon atoms, an alkylcarbonyl group having from 1 to 8 carbon atoms, or an arylcarbonyl group having from 1 to 8 carbon atoms; a and d each independently represent an integer of from 1 to 6; and plural $R^3$s, Ds, and Es may be the same as or different from each other, respectively.

[6] The ink composition of any one of [1] to [5], wherein a content of the particles of the water-insoluble polymer is 5% by mass or higher, relative to a total amount of the ink composition.

[7] The ink composition of [5] or [6], wherein a content of the dispersion stabilizer is from 0.1% by mass to 2% by mass, relative to a total amount of the ink composition.

[8] An image forming method comprising forming an image by ejecting the ink composition of any one of [1] to [7] onto a recording medium using a single pass method.

[9] The image forming method of [8], further comprising, before the forming of the image, applying, onto the recording medium, a treatment liquid including an aggregating agent capable of aggregating components of the ink composition.

[10] The image forming method of [9], wherein the treatment liquid includes an organic acid and a water-soluble organic solvent.

[11] The image forming method of any one of [8] to [10], further comprising removing ink adhered to an inkjet head which performs the ejecting.

According to the present invention, it is possible to provide an ink composition which has excellent ink stability and maintenance properties and with which an image with suppressed occurrence of blocking can be formed.

All publications, patent applications, and technical standards mentioned in this specification are herein incorporated by reference to the same extent as if each individual publication, patent application, or technical standard was specifically and individually indicated to be incorporated by reference.

What is claimed is:
1. An ink composition comprising:
a pigment that is coated with a water-insoluble resin; particles of a water-insoluble polymer having a glass transition temperature of 100° C. or higher;
a solid moistening agent;
a water-soluble organic solvent;
particles of a wax having a melting point of from 40° C. to lower than 100° C.;
water; and
a dispersion stabilizer that comprises a compound represented by the following Formula (1):

  Formula (1)

wherein, in Formula (1), $R^3$ represents an alkyl group having from 10 to 60 carbon atoms, an alkenyl group having from 10 to 60 carbon atoms, an aralkyl group having from 10 to 60 carbon atoms, or an aryl group having from 10 to 60 carbon atoms; G represents a linking group having a valency of from 2 to 7; D represents (B)$_n$-E, wherein B represents —CH$_2$CH$_2$O—, —CH$_2$CH$_2$CH$_2$O—, —CH(CH$_3$)CH$_2$O—, or —CH$_2$CH(OH)CH$_2$O—, n resents an integer of from 1 to 50 and E represents hydrogen, or an alkyl group having from 1 to 8 carbon atoms, an aryl group having from 1 to 8 carbon atoms, an alkylcarbonyl group having from 1 to 8 carbon atoms, or an arylcarbonyl group having from 1 to 8 carbon atoms; a and d each independently represent an integer of from 1 to 6; and plural $R^a$s, Ds, and Es may be the same as or different from each other, respectively.

2. The ink composition of claim 1, wherein the water-insoluble polymer has a glass transition temperature of from 100° C. to 200° C.

3. The ink composition of claim 1, wherein the wax is at least one selected from the group consisting of petroleum-derived waxes and vegetable-derived waxes.

4. The ink composition of claim 1, wherein the solid moistening agent is at least one selected from the group consisting of urea and urea derivatives.

5. The ink composition of claim 1, wherein a content of the particles of the water-insoluble polymer is 5% by mass or higher, relative to a total amount of the ink composition.

6. The ink composition of claim 1, wherein a content of the dispersion stabilizer is from 0.1% by mass to 2% by mass, relative to a total amount of the ink composition.

7. An image forming method comprising forming an image by ejecting the ink composition of claim 1 onto a recording medium using a single pass method.

8. The image forming method of claim 7, further comprising, before the forming of the image, applying, onto the recording medium, a treatment liquid including an aggregating agent capable of aggregating components of the ink composition.

9. The image forming method of claim 8, wherein the treatment liquid includes an organic acid and a water-soluble organic solvent.

10. The image forming method of claim 7, further comprising removing ink adhered to an inkjet head which performs the ejecting.

11. The ink composition of claim 1, wherein the solid moistening agent is urea.

12. The ink composition of claim 1, wherein the content of the solid moistening agent in the ink composition is from 5% by mass to 30% by mass.

* * * * *